(12) United States Patent
Seeley

(10) Patent No.: US 12,163,931 B2
(45) Date of Patent: Dec. 10, 2024

(54) FLUID MODULATOR, SYSTEM, AND METHOD

(71) Applicant: Oakland University, Rochester, MI (US)

(72) Inventor: John V. Seeley, Grand Blanc, MI (US)

(73) Assignee: Oakland University, Rochester, MI (US)

( * ) Notice: Subject to any disclaimer, the term of this patent is extended or adjusted under 35 U.S.C. 154(b) by 400 days.

(21) Appl. No.: 17/772,621

(22) PCT Filed: Oct. 27, 2020

(86) PCT No.: PCT/US2020/057477
§ 371 (c)(1),
(2) Date: Apr. 28, 2022

(87) PCT Pub. No.: WO2021/086827
PCT Pub. Date: May 6, 2021

(65) Prior Publication Data
US 2023/0010503 A1 Jan. 12, 2023

Related U.S. Application Data

(60) Provisional application No. 62/926,742, filed on Oct. 28, 2019.

(51) Int. Cl.
*B01D 53/22* (2006.01)
*G01N 30/20* (2006.01)
(Continued)

(52) U.S. Cl.
CPC ........... *G01N 30/20* (2013.01); *G01N 30/463* (2013.01); *G01N 2030/025* (2013.01); *G01N 2030/201* (2013.01)

(58) Field of Classification Search
CPC ....... G01N 2030/201; G01N 2030/025; G01N 30/20; G01N 30/463
See application file for complete search history.

(56) References Cited

U.S. PATENT DOCUMENTS 3,592,064 A * 7/1971 Gether .................. G01N 30/12
73/382 R
5,205,845 A * 4/1993 Sacks ..................... G01N 30/12
96/104
(Continued)

FOREIGN PATENT DOCUMENTS

JP 2010274101 A 12/2010
JP 2015233222 A 12/2015
(Continued)

OTHER PUBLICATIONS

International Search Report, PCT/US2020/057477, dated Mar. 18, 2021.
(Continued)

*Primary Examiner* — Anthony R Shumate
(74) *Attorney, Agent, or Firm* — Fishman Stewart PLLC

(57) ABSTRACT

A fluid modulator includes a fluid manifold, fluid valve, and pressure/flow controller. The manifold may include a primary tee, exhaust tee, secondary tee, loop conduit, and joining tube. The valve may include a common port, normally-open output port connected to the secondary tee, and normally-closed output port connected to the primary tee. The controller may be configured to provide auxiliary fluid to the common port. In embodiments, the primary tee, exhaust tee, and secondary tee are configured with the primary tee and secondary tee situated at ends of the fluid manifold and the exhaust tee disposed therebetween. In other embodiments, the exhaust tee, the primary tee, and the secondary tee are distributed in a linear fashion with the exhaust tee and secondary tee situated at ends of the fluid (Continued)

manifold and the primary tee disposed therebetween. An embodiment with a single, unitary 5-port fluid manifold is also disclosed.

23 Claims, 38 Drawing Sheets

(51) Int. Cl.
  *G01N 30/46* (2006.01)
  *G01N 30/02* (2006.01)

(56) References Cited

U.S. PATENT DOCUMENTS

| | | | |
|---|---|---|---|
| 5,281,256 A * | 1/1994 | Sacks | G01N 1/26 96/104 |
| 5,492,555 A * | 2/1996 | Strunk | G01N 30/463 95/87 |
| 7,091,044 B2 | 8/2006 | Cai | |
| 8,119,983 B2 | 2/2012 | Ochiai | |
| 10,054,510 B2 | 8/2018 | Baba | |
| 2002/0148353 A1* | 10/2002 | Seeley | G01N 30/463 96/101 |
| 2004/0232366 A1 | 11/2004 | Seeley | |
| 2007/0029477 A1 | 2/2007 | Miller et al. | |
| 2007/0193336 A1 | 8/2007 | McCurry | |
| 2009/0007624 A1* | 1/2009 | Bade | G01N 35/1097 73/1.16 |
| 2011/0247403 A1* | 10/2011 | Liu | G01N 30/463 250/288 |
| 2012/0118049 A1* | 5/2012 | Tipler | G01N 30/62 73/61.56 |
| 2012/0298234 A1 | 11/2012 | Haehn et al. | |
| 2014/0061133 A1 | 3/2014 | Herman | |
| 2016/0054274 A1* | 2/2016 | Cormier | G01N 30/20 73/61.55 |
| 2016/0069845 A1 | 3/2016 | Fogwill et al. | |
| 2017/0100682 A1* | 4/2017 | Wikfors | G01N 30/34 |
| 2019/0070524 A1* | 3/2019 | Martino | G01N 30/32 |
| 2020/0064312 A1* | 2/2020 | Musacchio | G01N 30/32 |
| 2021/0156826 A1* | 5/2021 | Hill | G01N 30/34 |
| 2023/0090089 A1 | 3/2023 | Blumberg | |

FOREIGN PATENT DOCUMENTS

| | | |
|---|---|---|
| JP | 2017053780 A | 3/2017 |
| WO | 2015083793 A1 | 6/2015 |

OTHER PUBLICATIONS

Great Britain Examination Report, GB2206995.9, dated Jul. 11, 2022, 2 pages.
Gas Chromatography, Pool C., Published 2012, Elsevier Science, p. 171.
European Search Report for EP20882694.1 (6 pages) Oct. 23, 2023.
Chiara Cordero, "Potential of the reversed-inject differential flow modulator for comprehensive two-dimensional gas chromatography in the quantitative profiling and fingerprinting of essential oils of different complexity," Journal of Chromatography A, 2015, 1417, pp. 79-95.
Andre Morgado Lopes , Optimization of the Analysis of Gasolines With GCxGC , Master's Degree Thesis (University of Porto), Jul. 2015, pp. 17-19.
Japanese Office Action, JP2022-552122, dated Apr. 17, 2024 (w_translation).
English abstract for JPA 2010274101.
English abstract for JPA 2015233222.

* cited by examiner

FLUID MODULATOR, SYSTEM, AND METHOD

CROSS-REFERENCE TO RELATED APPLICATION

This application is a National Stage patent application of International Patent Application No. PCT/US20/57477, filed Oct. 27, 2020, which claims the benefit of U.S. Provisional Patent Application Ser. No. 62/926,742, filed on Oct. 28, 2019, the disclosures of which are hereby incorporated by reference in their entirety as though fully set forth herein.

TECHNICAL FIELD

The present disclosure generally relates to fluid modulators, including fluid modulators that may be used in connection with chromatography.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid modulator designs may not provide sufficient performance, may not be efficient, and/or may be particularly complex.

There is a desire for solutions/options that minimize or eliminate one or more challenges or shortcomings of fluid modulators. The foregoing discussion is intended only to illustrate examples of the present field and is not a disavowal of scope.

SUMMARY

In embodiments, a fluid modulator may include a fluid manifold having a primary tee, an exhaust tee, a secondary tee, a loop conduit, and/or a joining tube; a fluid valve having a common port, a normally-open output port connected to the secondary tee, and/or a normally-closed output port connected to the primary tee; and/or a flow controller configured to provide auxiliary fluid to the common port of the fluid valve. The primary tee, the exhaust tee, and the secondary tee may, for example, be distributed in a linear fashion with the primary tee and secondary tee situated at the ends of the fluid manifold and the exhaust tee therebetween. The primary tee may be connected to the exhaust tee by the loop conduit. The exhaust tee may be connected to the secondary tee by the joining tube. The loop conduit may be longer, and may even be significantly longer, than the joining tube. The primary tee may be configured for connection with a primary column. The secondary tee may be configured for connection with a secondary column.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIG. 11 generally illustrates a starting point; FIG. 12 generally illustrates a scenario shortly after entering an inject state; FIG. 13 generally illustrates an example of a final moment of the inject state; and FIG. 14 generally illustrates an example of a scenario shortly after returning to the load state.

FIG. 16A generally illustrates an example flow pattern during the load state, and FIG. 16B generally illustrates an example flow pattern during an inject state.

DETAILED DESCRIPTION

Figure 1:
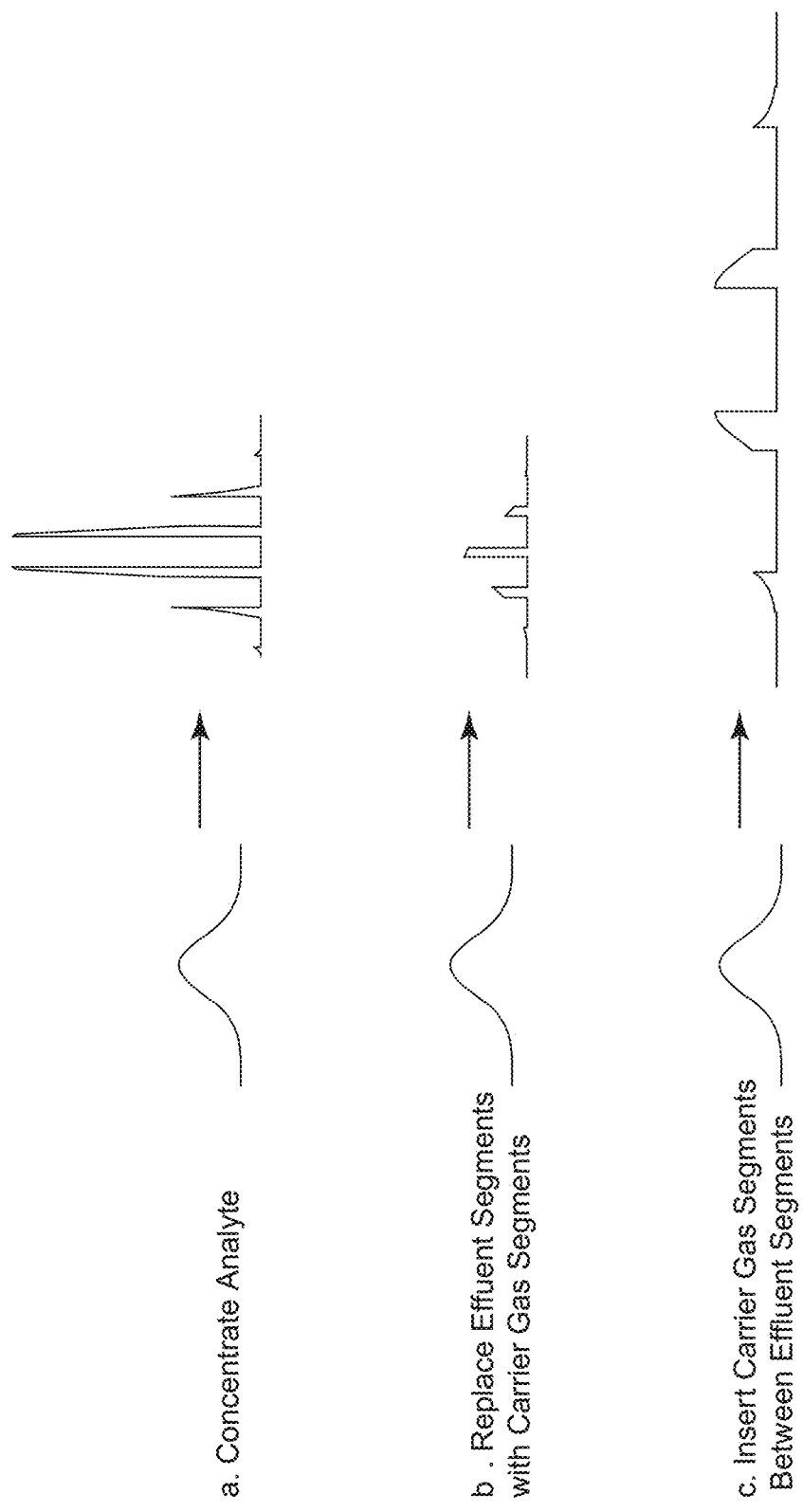
FIG. 1 is an illustration of three example mechanisms that may be used to convert component peaks eluting from a primary column into a series of pulses separated by segments of carrier gas.

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

In embodiments, a fluid system may include a device configured to combine two fluid streams to yield a new stream that may contain alternating segments of the incoming streams. Mixing between the segments may be reduced and/or minimized. The sizes of the fluid segments may be controlled by the magnitude of the incoming flows and/or the timing of switching events. The device may be optimized as a flow modulator that may be utilized in connection with comprehensive two-dimensional gas chromatography (GC× GC) separations. In this capacity, the device may combine gas exiting a gas chromatography column (the primary column) with an auxiliary flow of carrier gas, such as to generate a stream that has segments of primary effluent separated by larger segments of carrier gas. This new stream may be directed into a secondary column for further separation. While the device is described in connection with a GC×GC modulator, the device is not limited to this application and could be utilized in a wide range of applications, including without limitation, as a conventional gas chromatography injector, a modulator for liquid chromatography, and/or as sample inlet for flow injection analysis, among others.

GC×GC analysis may extend conventional gas chromatography (GC) by adding a high-speed secondary separation at the end of a conventional GC separation. GC×GC separations may be generated using a standard gas chromatograph equipped with mostly stock components except for the notable addition of one device unique to GC×GC: the modulator. The modulator may sample effluent leaving a first column and transfer the sampled effluent to the head of a second column, such as in the form of a narrow pulse (typically less than 100 ms).

A fluid mixture of interest may first be injected into a standard GC column that serves as the primary column. A flow of carrier gas may transport the individual components of the mixture down the primary column at velocities that may be characteristic to each component. The modulator may be disposed in the fluid path between the end of the primary column and the head of the secondary column. Components eluting from the primary column may be sampled by the modulator, such as at a regular interval (e.g., the "modulation period"). The modulation period may be kept slightly smaller than the widths of the component peaks emerging from the primary column. In some cases, the modulation period may be, for example, in the range of about 1 to about 3 seconds. At the end of each modulation period, the components that were sampled during that particular interval may be transferred to the secondary column. A stationary phase of the secondary column may have a selectivity that differs from that of the primary column, so components that co-eluted on the primary column may potentially be separated on the secondary column. A high-speed GC separation may be performed in the secondary column on each fraction transferred by the modulator. In this way, the analysis of a single sample mixture may involve one separation on the primary column and hundreds of sub-separations on the secondary column. Experimental conditions may be adjusted to limit the range of secondary retention times to a value less than the modulation period. Sample components may be detected as they exit the secondary column. A detector signal array may be divided into individual segments with widths that may be about equal to the modulation period. These signal segments may represent each sub-separation and may be plotted side-by-side to yield a two-dimensional chromatogram.

A GC×GC modulator may be configured to convert component peaks eluting from a primary column into a series of pulses separated by segments of carrier gas. Three example mechanisms that may be used to generate this effect are generally illustrated in FIG. 1. The first mechanism may be configured to concentrate the analyte molecules. This may involve temporarily immobilizing the eluting analyte molecules while allowing the carrier gas molecules to pass through the modulator unimpeded. At the end of each modulation period, the collected analyte molecules may be rapidly re-mobilized into the carrier stream as a concentrated pulse. Repetition of this process may produce a gas stream of highly concentrated zones separated by pure carrier gas. The immobilization and remobilization of analyte molecules involved with this approach may be conducted via the introduction of large temperature gradients. This type of modulation process may be referred to as thermal modulation.

The second example modulation mechanism involves replacing segments of primary effluent with equally sized segments of carrier gas (e.g., pure carrier gas). This may involve supplying the secondary column with an auxiliary flow of pure carrier gas and briefly introducing a portion of the primary effluent at the beginning of each modulation period. The result may include a stream of small primary effluent segments separated by carrier segments. Unlike thermal modulation, analytes in the primary effluent segments may not be concentrated, so this method may lead to diminished sensitivity due to a loss of a majority of analyte molecules. However, this approach may be relatively simple to implement. For example and without limitation, such an approach may involve only a valve and a few fittings. This mechanism may be a low-duty cycle modulation mechanism and may be referred to herein as diverting flow modulation.

The third example modulation mechanism may involve inserting large segments of auxiliary carrier gas between segments of primary effluent. Unlike diverting modulation, analyte molecules from the primary effluent may not be discarded, but they may also not be concentrated. Adding auxiliary carrier gas without discarding any primary effluent may provide the modulated stream with a significantly higher flow than the original flow in the primary column and, as a result, there may be a significantly higher flow in the secondary column. This may result in a high-velocity stream of non-concentrated primary effluent segments separated by larger segments of pure carrier gas. This mechanism may be configured as a high duty cycle modulation mechanism and may be referred to herein as differential flow modulation.

With examples, differential flow modulation may be fairly simple to implement with a valve and some fittings, but it may be difficult to find conditions that produce optimal pulse shape. Mass spectrometric detection may be limited with differential flow modulation. Benchtop mass spectrometers may be designed to have maximum input flows similar to those associated with conventional single-column GC separations. The elevated flow associated with differential flow modulation may lead to the majority of secondary effluent being split-off prior to entering a bench-top mass spectrometer. Thus, a flux advantage that differential flow modulation may have over diverting modulation may be largely lost with detectors that have flow limitations or detectors that respond exclusively to analyte concentration. Some GC×GC separations may be conducted with a flame ionization detector (FID). Without limitation, a FID is an example of a single channel detector. FIDs may be configured to easily handle the elevated carrier flow levels and exhibit increased signal intensities with differential flow modulation.

Some thermal modulators may employ gas jets cooled with liquid nitrogen to immobilize analytes and heated gas jets for remobilization. The operation of a thermal modulator may involve the consumption of large quantities of cryogenic fluid, which may involve a significant increase in operating expense when compared to conventional gas chromatography.

Some flow modulators may employ high-speed, multiport valves to produce primary component pulses. Multiport valves with internal diaphragms (in contrast to rotary elements) may have sufficient speed to produce narrow pulses, but these valves may have temperature constraints that may limit the upper temperature of the GC×GC separations. A second potential drawback of multiport valves is that actuation of the valves during modulation may produce brief but significant flow changes within the secondary column. This could lead to peak distortion in the resulting chromatogram.

Examples of fluidic modulators may employ a three-way valve and an assembly of unions and tubing (or equivalent integrated tubing and unions). An auxiliary flow of carrier gas may be introduced to the common port (e.g., input port for flow from a fluid/pressure controller) of the three-way valve. The two output ports of the valve may be connected to the union assembly. The exit of the primary column and entrance of the secondary column may also be connected to the union assembly. The exact layout of the tubing and unions may be modulator-specific.

Fluidic modulators may use the valve to switch the entry point of the auxiliary gas within the union assembly. This may result in changes in the direction/magnitude of the flows within the union assembly, which may generate the desired mixing of primary effluent and auxiliary carrier gas. Fluidic modulators may have several advantages that may be a result of (1) the only moving parts of the device may be in a three-way valve and/or (2) the sample components may never pass through the three-way valve. Thus, the valve may be placed outside of the chromatographic oven and may not be constructed from deactivated materials and may not be excessively miniaturized. The unions and tubing that may be within the sample path may be static devices that may be more easily fabricated from inert materials and with small dimensions. Fluidic modulators may not introduce additional temperature restrictions on the chromatographic separation.

An example of a fluidic device is the original capillary flow technology (CFT) modulator offered by Agilent Technologies. The CFT modulator may be configured to provide 100% transfer of primary effluent to the secondary column, but may produce pulses with "tails" that could obscure neighboring, low-intensity peaks. Another example of a fluidic device is a reverse fill/flush (RFF) modulator.

Some modulators, such as those offered by Agilent Technologies and SepSolve, may require high flow in the secondary column, which may render such modulators difficult to couple to mass spectrometric detection without some form of flow splitting. Differential flow modulation GC×GC–MS instruments may be complicated and difficult to implement properly.

If the flow in the secondary column is comparable to the flow in the primary column (as may be the case in GC×GC–MS separations) a differential flow modulator may not provide significant advantages. The simplicity and flexibility of a diverting modulator may render the diverting modulator a more effective option. However, if the detector can operate at higher flow rates and has a response proportional to the flux of the analyte (like an FID), then a differential flow modulator may provide greater sensitivity.

The chromatographic efficiency of a given length of GC column may tend to decrease with increasing flow once the flow, for example, gets above approximately 2 mL/min, which may suggest that high resolution secondary separations are not possible with the high flows associated with differential flow modulation. However, the chromatographic resolving power available at high flows may be much greater than previously realized. Increasing the length of the column while increasing flow, using thin stationary films, and/or operating with small retention factors may improve the resolving power. For example and without limitation, a 5 m long capillary column operated at a 10 mL/min flow rate may generate separations with narrow peaks (peak widths <about 50 ms).

It may be counterproductive to inject pulses into the secondary column that are wider than about 50 ms. Previously, it had been assumed that increasing the modulation transfer percentage increases sensitivity. However, this is not true if increasing the transfer percentage makes the resulting peaks wider but not taller. For example, separations involving an RFF modulator transfer of 100% of the primary effluent to the secondary column may produce peak with widths near 200 ms. Injecting narrower pulses into the secondary column could potentially produce peaks that are just as tall, but have a quarter of the width. Therefore, injecting narrow pulses may produce higher resolution separations without sacrificing sensitivity.

The width of the pulses produced by a full transfer differential flow modulator may be proportional to the ratio of the primary column flow to the secondary column flow. As such, it may be possible to reduce pulse width while maintaining 100% transfer by decreasing the primary flow and/or increasing the secondary flow. However, this approach may cause changes beyond just decreasing the pulse widths (e.g., the primary separation may slow down, the secondary separation may speed up, the chromatographic efficiencies of both the primary column and secondary columns may be decreased, etc.).

Figure 2:
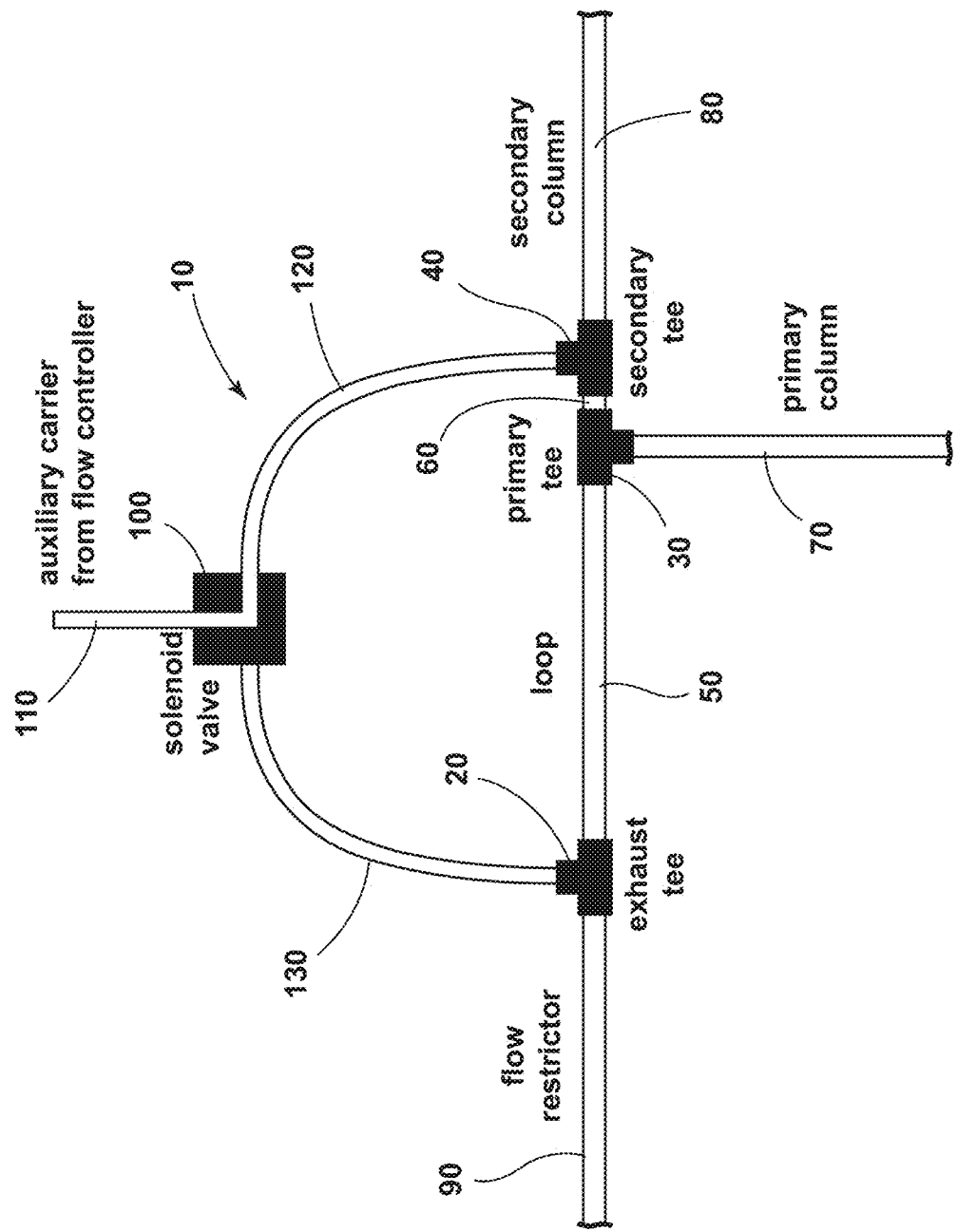
FIG. 2 is a schematic of an embodiment of an RFF modulator according to aspects and teachings of the present disclosure.

A schematic of an embodiment of an RFF modulator 10 is generally illustrated in FIG. 2. Some RFF modulators may integrate several of the unions and conduits into a single piece of hardware. The design shown in FIG. 2 includes discrete unions and tubing, but may employ the same principles and flow patterns as integrated designs.

The center of the assembly may include a 5-port manifold 10 that may be constructed from three tee unions and two tubes. The tee unions may be designated as the exhaust tee 20, the primary tee 30, and the secondary tee 40. The unions may be distributed, for example, in a linear fashion (e.g., coaxial layout), with the exhaust tee 20 and secondary tee 40 situated at the ends of the manifold and the primary tee 30 disposed therebetween. The exhaust tee 20 may be connected to the primary tee via a length of tubing that may be referred to as a loop (or loop conduit) 50. The primary tee 30 may be connected to secondary tee 40 with a length of tubing that may be referred to as the joining tube 60. The loop conduit 50 may be longer, and may even be significantly longer, than the joining tube 60. The exit of the primary column 70 may be connected to the primary tee 30 and the entrance of the secondary column 80 may be connected to the secondary tee 40.

Also illustrated in the embodiment shown in FIG. 2 are a primary column 70, a secondary column 80, a flow restrictor 90, a valve (e.g., solenoid valve) 100, and an auxiliary carrier 110 (shown from flow controller). An auxiliary flow of carrier gas may be introduced into the manifold 10 via one or more additional components. A flow controller (which may comprise a pressure/flow controller) may feed the auxiliary gas into a common port of a fluid valve 100, such as a 3-port, 2-way solenoid valve. A normally-open output port of the valve 100 may be connected to the secondary tee 40 through a short length of tube (e.g., 120). A normally-closed output port of the valve 100 may be connected to the exhaust tee 20 through a similar short length of tube (e.g., 130). Two flows may enter the modulator: (i) the primary column effluent and (ii) auxiliary carrier flow. Fluid may exit the device by entering the secondary column 80 and/or entering the flow restrictor 90. In embodiments, a flow restrictor 90 may be connected to an exhaust tee 20 and can be a static device, such as a carefully selected length of capillary tubing, or an adjustable device like a back-pressure regulator, or a device that combines a static flow restrictor with an adjustable restrictor.

An RFF modulator may be configured to produce an intended result through the precise control of flow patterns within the device. The flows entering the modulator and exiting the modulator may be essentially constant and balanced. This condition may lead to the flow balance equation $F1+Fs=F2+Fx$; where $F1$ is the primary column flow, $Fs$ is the auxiliary carrier gas flow, $F2$ is the secondary column flow, and the $Fx$ exhaust flow. The RFF modulator may be configured as a two-state device. The state of the device may be determined by the injection location of the auxiliary carrier gas which may, in turn, be determined by the state of the solenoid valve. The two primary states of the device may be designated as the load state and the inject state.

Figure 3:
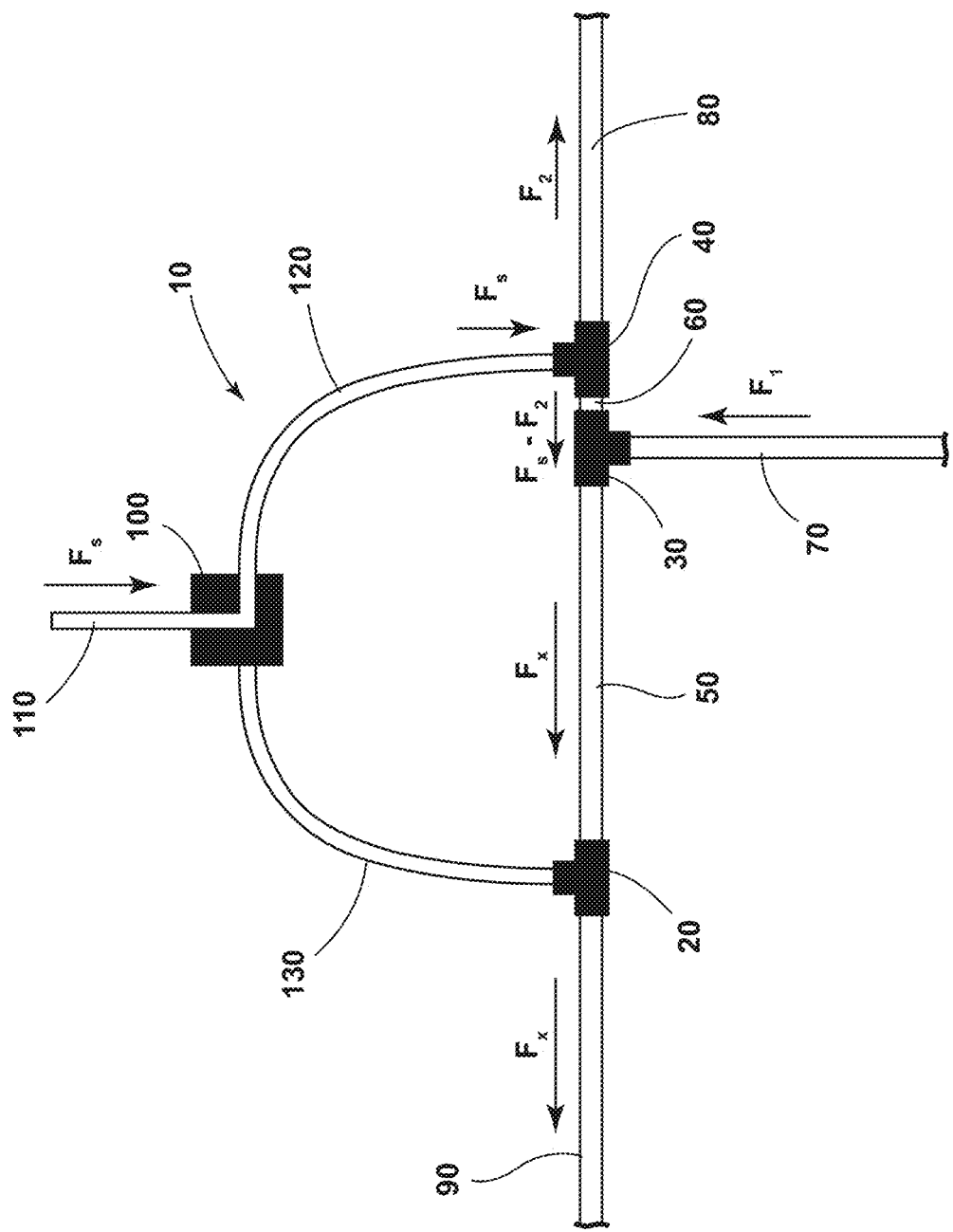
FIG. 3 is a schematic of a flow pattern associated with a load state in connection with an embodiment an RFF modulator according to aspects and teachings of the present disclosure.

An example embodiment of a flow pattern associated with the load state is generally illustrated in FIG. 3. The load state may be generated by directing an auxiliary gas flow to a secondary tee 40. The magnitude of the auxiliary flow may be carefully adjusted to be slightly larger than the secondary carrier flow. This may allow the auxiliary flow to supply all of the gas for by the secondary column 80 and may leave extra carrier gas to flow out of the secondary tee 40 through the joining tube 60 toward the primary tee 30 with a flow rate given by $Fs-F2$. This carrier gas flow may facilitate the modulation process and may be referred to as the curtain flow $Fc=Fs-F2$. The primary flow may simultaneously enter the RFF modulator at the primary tee 30 where it may mix with the curtain flow and then may enter the loop 50. The combined primary effluent and curtain flow may pass through the loop 50 during the load state at a flow rate that may be referred to as the exhaust flow $Fx$. The flow balance equation can be used to express the exhaust flow in terms of the three other external flows: $Fx=F1+Fs-F2$. This flow may ultimately exit the modulator through an exhaust tee 20, and then may enter a flow restrictor 90.

Figure 4:
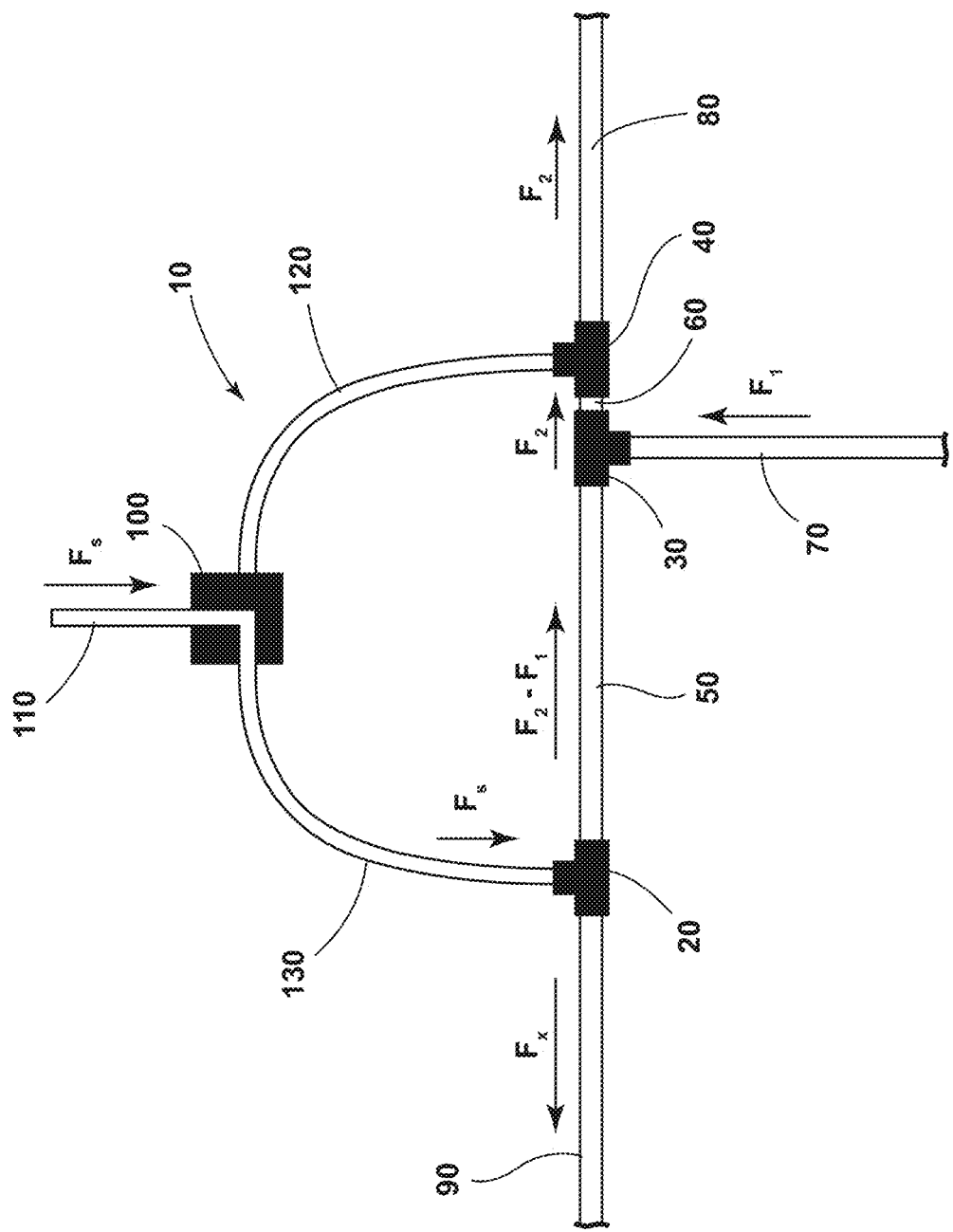
FIG. 4 is a schematic of a flow pattern associated with an inject state in connection with an embodiment an RFF modulator according to aspects and teachings of the present disclosure.

An embodiment of an example flow pattern associated with the inject state is generally illustrated in FIG. 4. The inject state may be generated by energizing the solenoid valve to send the auxiliary flow to the exhaust tee. Under the differential flow conditions that may be utilized by the RFF modulator, the secondary column flow may be greater than the primary column flow. Thus, auxiliary flow may split upon entering the exhaust tee 20 with a portion given by the difference of the secondary and primary flows, $F2-F1$, passing through the loop 50 toward the primary tee 30 and the remainder $Fs+F1-F2$ (which is equal to $Fx$) exiting the modulator through the flow restrictor 90. The loop flow of $F2-F1$ may combine with the incoming primary flow in the primary tee to generate a flow of $F2$ that may pass through the joining tube 60, then the secondary tee 40, and finally into the secondary column 80.

Figure 5:
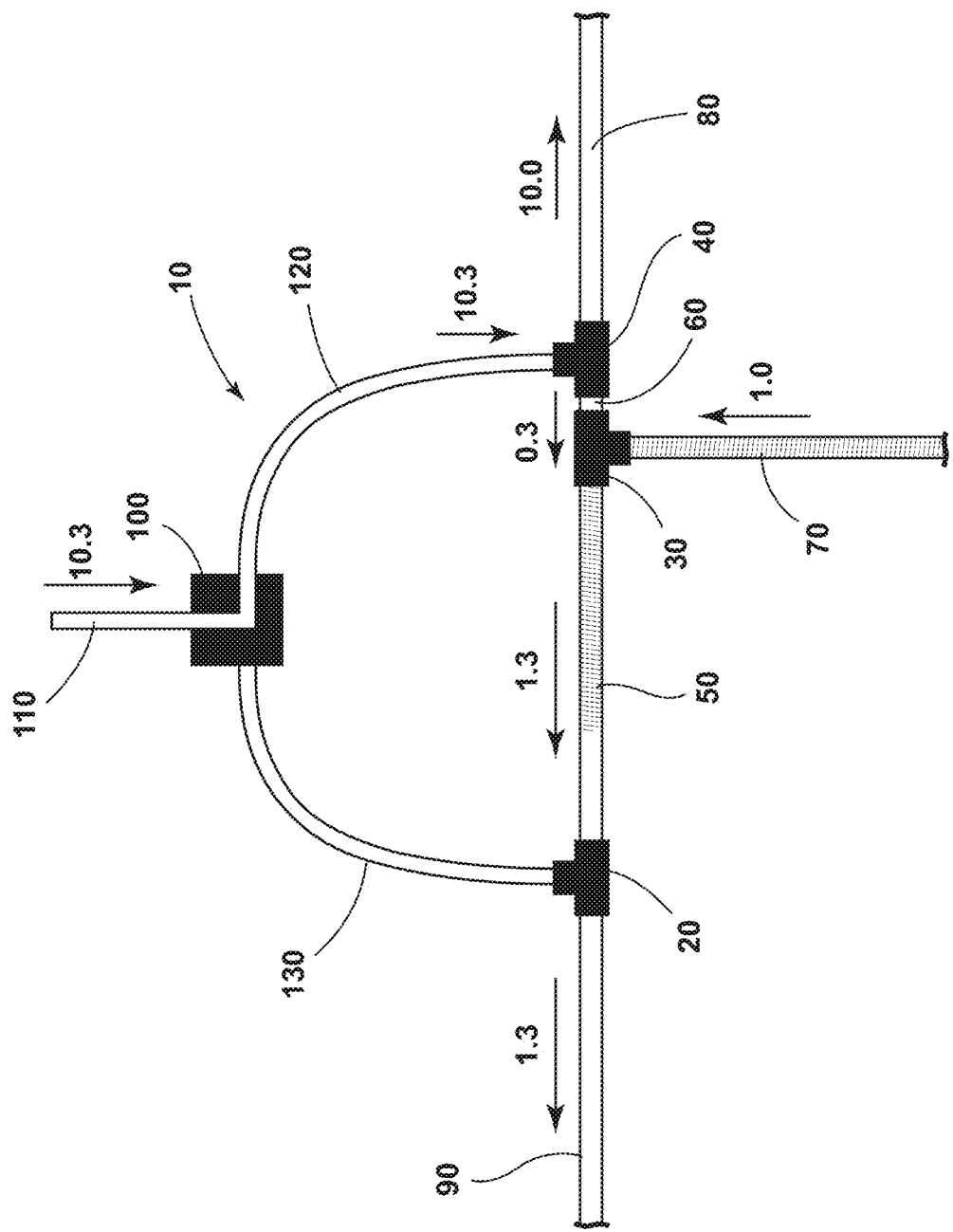
FIG. 5 is a schematic of a flow pattern associated with an embodiment an RFF modulator according to aspects and teachings of the present disclosure, in a load state, and with an auxiliary flow split in two directions according to aspects and teachings of the present disclosure.
Figure 6:
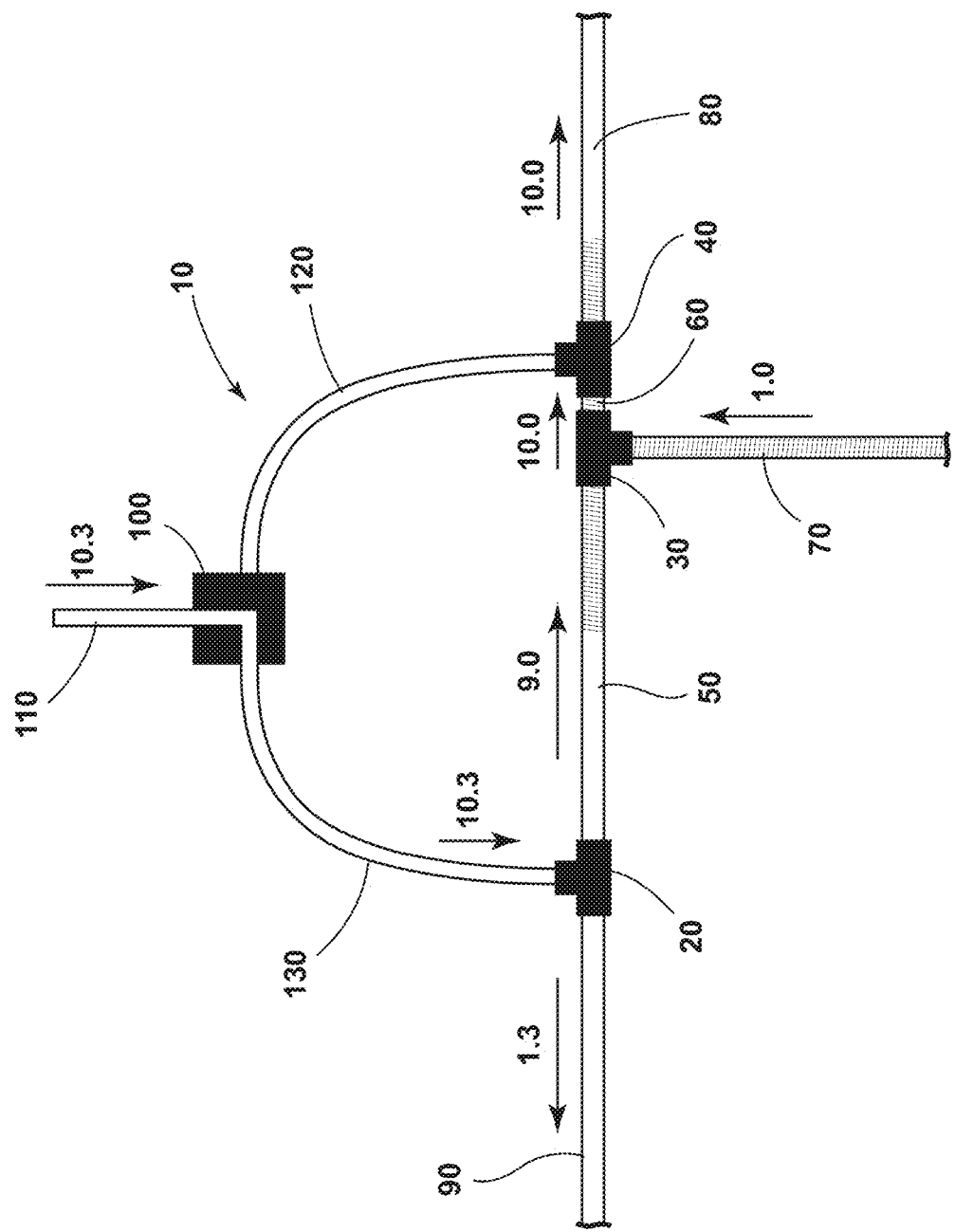
FIG. 6 is a schematic of a flow pattern associated with an embodiment an RFF modulator according to aspects and teachings of the present disclosure, and generally illustrating a flow situation shortly after transitioning to an inject state.
Figure 7:
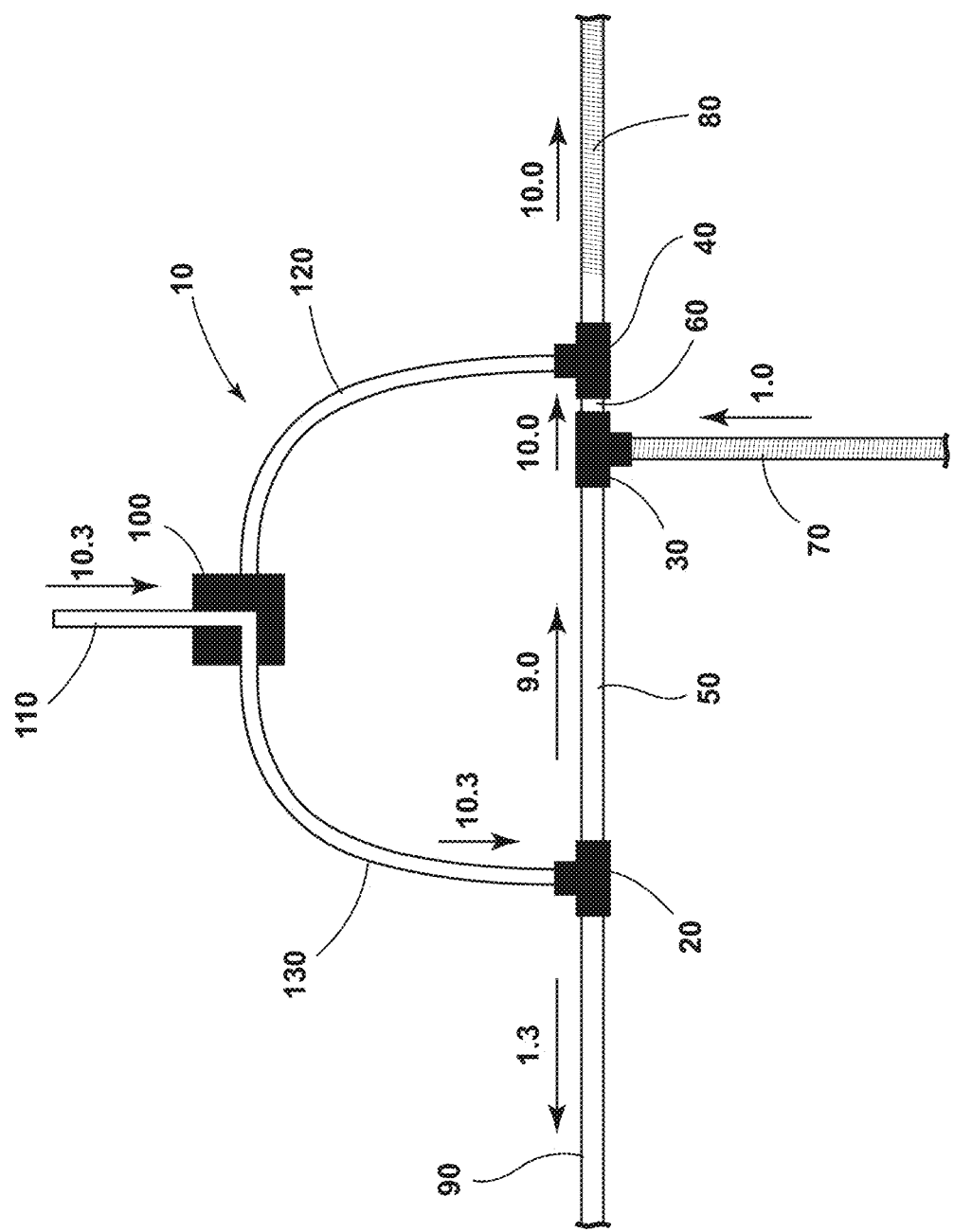
FIG. 7 is a schematic of a flow pattern associated with an embodiment an RFF modulator according to aspects and teachings of the present disclosure, and generally illustrating a modulator at a point when all of the collected primary effluent has just been transferred to a secondary column.

An RFF modulator may be configured to create a fluid stream that contains segments of primary effluent separated with larger segments of carrier gas. An embodiment of an example modulation process is generally illustrated in FIGS. 5-7. Undiluted primary effluent is identified in the figures as fill by hatch marking, and the carrier gas is shown as a white fill. The RFF modulator may generate pulses through the adjustment and control of the flows, loop size, and the timing of switching between the load and inject states. For example and without limitation, the following external flow values may be involved: F1=1 mL/min, Fs=10.3 mL/min, F2=10 mL/min, and Fx=1.3 mL/min.

A starting point of the modulation cycle (see, e.g., FIG. 5) may be considered to be when the modulator has been in the load state long enough for the primary effluent to nearly fill (but not overfill) the loop 50. Because the modulator is in the load state, an auxiliary flow (e.g., 10.3 mL/min) may be split in two directions with a first portion (e.g., 10.0 mL/min) going to the secondary column 80 and a second portion (e.g., 0.3 mL/min) acting as the curtain flow. Such a second portion (e.g., 0.3 mL/min) flow may combine with the primary column flow (e.g., 1.0 mL/min) prior to entering the loop 50, which may decrease the concentration of analytes in the effluent by up to 30%, about 30%, or even more than 30%.

The solenoid valve may be switched to place the RFF modulator into the inject state prior to the primary effluent reaching the exhaust tee 20. FIG. 6 generally illustrates an example of the situation shortly after transitioning to the inject state. The auxiliary carrier may enter an exhaust tee 20 where a portion of flow (e.g., 1.3 mL/min) may immediately exit through a flow restrictor 90 while a remaining portion of flow (9.0 mL/min) may push the collected primary effluent toward a primary tee 30. Within the primary tee 30, the collected primary effluent may combine with new primary effluent and then continue on to the joining capillary (e.g., joining tube 60), the secondary tee 40, and may ultimately enter the secondary column 80.

FIG. 7 generally illustrates an RFF modulator at the point when all of the collected primary effluent has just been transferred to the secondary column 80. At this point, the valve 100 may be deenergized and the RFF modulator may be allowed to revert back to the load state where the injected pulse continues to move down the secondary column 80 and the primary effluent starts filling the loop 50 again.

However, for some applications, RFF modulators may include one or more potential challenges. First, during the load state, an RFF modulator may mix the curtain gas with the incoming primary effluent. This may dilute/expand the primary effluent, which may decrease the pulse intensity and increase the pulse width. Thus, it may be desirable to keep the curtain flow to a minimum or an absolute minimum. But curtain flow may be used to prevent the primary effluent from "bleeding" into the secondary column 80 during the load state. So, a balance may be involved to get optimal peak shape without baseline bleed. This balance may be challenging to maintain, such as because the magnitude and direction of the curtain flow may be determined by the difference of two larger numbers (Fs and F2). A second potential challenge is related to the first. A low curtain flow may make it difficult to operate the modulator with duty cycles less than 100% (e.g., less than full transfer modulation). It may be possible to inject narrower pulses into the secondary column 80 by returning the RFF modulator to the load state prior to flushing all of the collected primary effluent from the loop 50 (e.g., clipping the back edge of the outgoing pulse). But the small curtain flow involved with optimizing peak height may make it difficult to quickly reverse the movement of primary effluent that is still in the joining tube 60. Thus, using the RFF modulator in a less-than-full transfer mode may result in pulses with significant tailing. The RFF modulator may not be as effective when trying to work at the lower duty cycles that may be involved with generating narrower pulses that can fully exploit the resolving power of the secondary separation.

Embodiments of a flow modulator may be configured to not dilute the collected primary effluent (a challenge that may be associated with an RFF modulator) and/or allow the user to directly control the width of the injected pulses. Embodiments of the fluid modulator may be configured as a differential flow modulator that may allow users to maximize peak height while working with optimal peak widths (e.g., peaks with widths in the 30 to 60 ms range, approximately).

Figure 8:
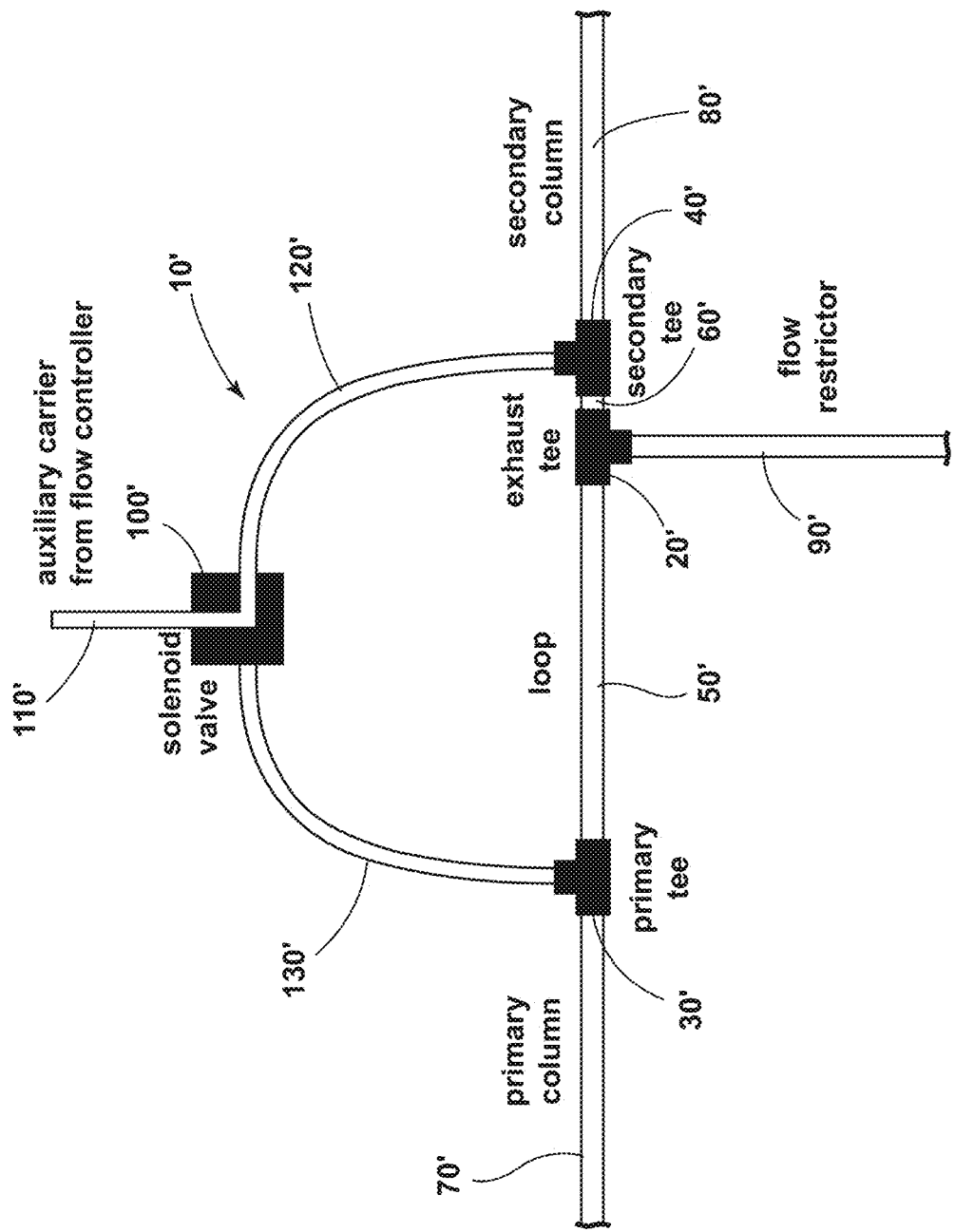
FIG. 8 is a schematic of an embodiment of a modulator according to aspects and teachings of the present disclosure, and including a 5-port manifold.

A schematic of an embodiment of a modulator is generally illustrated in FIG. 8. The modulator may include a 5-port manifold 10' that may, for example, be constructed from three tee unions and two tubes. The tee unions may include a primary tee 30', an exhaust tee 20', and a secondary tee 40'. The unions may be distributed, for example, in a linear fashion (or coaxial layout), with the primary tee 30' and secondary tee 40' situated at the ends of the manifold and the exhaust tee 20' therebetween. The primary tee 30' may be connected to the exhaust tee 20' with a length of fluid conduit (e.g., tubing) that may be referred to as a loop 50'. The exhaust tee 20' may be connected to the secondary tee 40' with a length of fluid conduit that may be referred to as a joining tube 60'. The loop conduit 50' may longer, and may even be significantly longer, than the joining tube 60' (notably, some schematics of the modulator that appear in the drawings show the joining tube at a larger scale than may actually be used in applications). The exit of the primary column 70' may be connected to the primary tee 30' and the entrance of the secondary column 80' may be connected to the secondary tee 40'. While the inventive concept is not necessarily limited to being configured in a linear fashion, it is noted that configuring the modulator/system in a linear fashion (e.g., a coaxial layout among the three tees) may, among other things, permit the adjustment of effective lengths of the loop and joining capillary, such as by modifying or adjusting an insertion depth of a primary and/or secondary column. Such an advantage or benefit may be created, for example, by having the loop coaxial with a primary column 70' and inserting the primary column 70' through a primary tee 30', and having a secondary column 80' coaxial with the joining capillary (e.g., joining tube 60') and inserting the secondary column 80' through a secondary tee 40'.

With examples of a modulator, an auxiliary flow of carrier gas may be introduced into the manifold via one or more additional components. A flow controller (or pressure/flow controller) may feed the auxiliary gas into the common port of a valve 100' (e.g., a 3-port, 2-way solenoid valve). A normally-open output port of the valve 100' may be connected to the secondary tee 40' through a short tube 120'. A normally-closed output port of the valve 100' may be connected to the primary tee 30' through a similar short tube 130'.

Gas may enter the modulator at two locations: (i) primary effluent may enter from the primary column 70' and (ii) carrier gas may enter at the valve 100'. Gas may leave the modulator at two locations: (i) gas may flow into the secondary column 80' and (ii) gas may flow into the flow restrictor 90'. The flow restrictor 90' may be configured, example, as a static device, such as a length of capillary tubing, or an adjustable device, such as a back-pressure regulator, or as a device that combines a static flow restrictor with an adjustable restrictor.

Examples of a modulator may produce pulses of primary effluent, such as through the precise control of flow patterns within the device. The flows entering the modulator may be essentially constant and/or may be balanced with those exiting the modulator. This condition may lead to the flow balance equation $F1+Fs=F2+Fx$; where F1 corresponds to the primary column flow, Fs corresponds to the auxiliary carrier gas flow, F2 corresponds to the secondary column flow, and Fx corresponds to exhaust flow (see, e.g., FIG. 9). The modulator may be configured as a two-state device. The state of the device may be determined by the injection location of the auxiliary carrier gas which may, in turn, be determined by the state of the valve. The two states of the device may be designated as a load state and an inject state.

Figure 9:
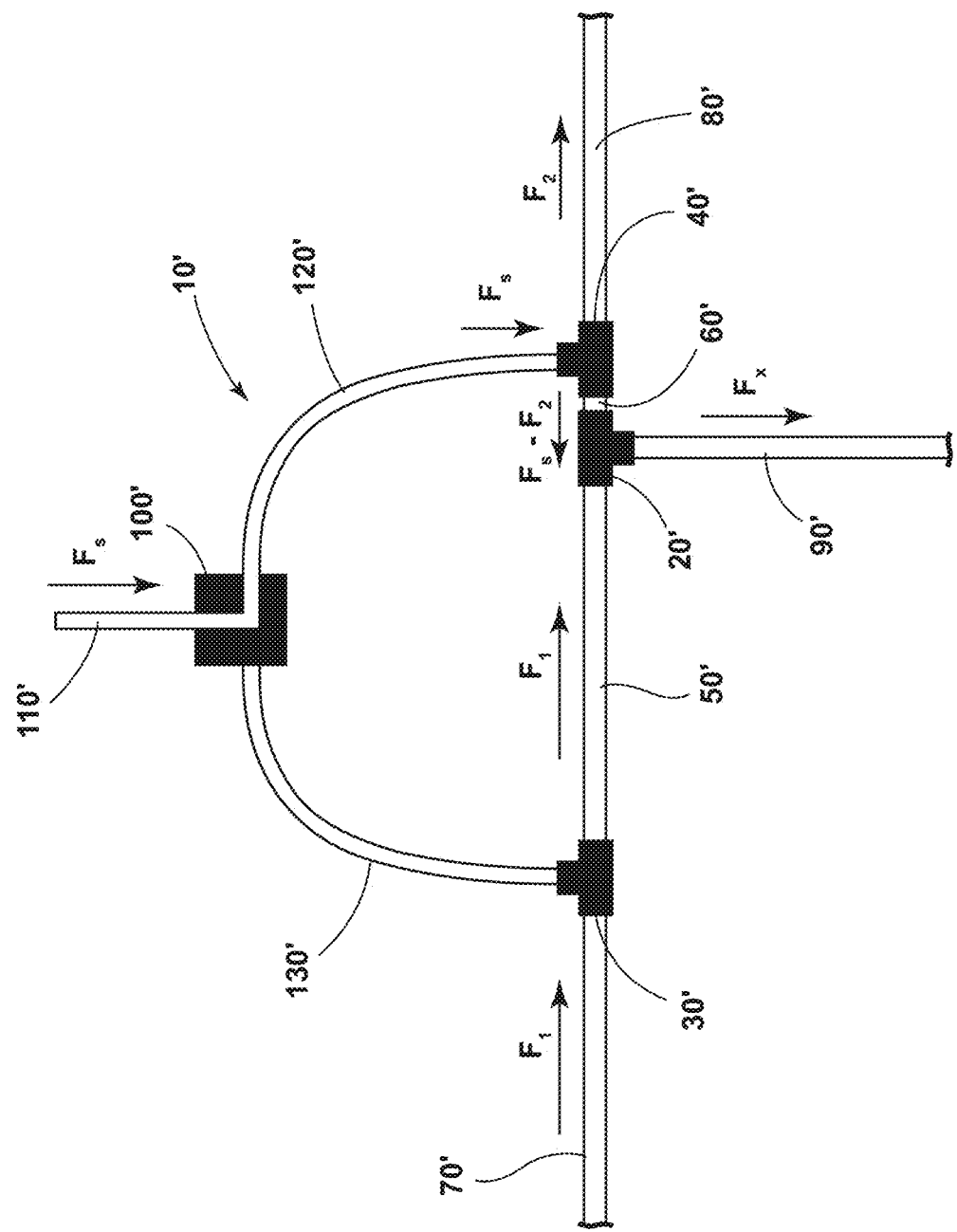
FIG. 9 is a schematic of a flow pattern associated with a load state in connection with an embodiment a modulator according to aspects and teachings of the present disclosure.

An example flow pattern associated with the load state is generally illustrated in FIG. 9. The load state may be generated by directing the auxiliary gas flow to the secondary tee 40'. The magnitude of the auxiliary flow may be set to be larger than the secondary carrier flow. This may allow the auxiliary flow to supply all of the carrier gas for the secondary column 80' and the extra carrier gas may flow out of the secondary tee 40', through the joining tube 60', and into the exhaust tee 20'. This flow may be referred to as the curtain flow and it may have a magnitude represented by $Fc=Fs-F2$. The curtain flow may be configured to restrict and/or prevent primary effluent from entering the secondary column 80' during the load state. While the auxiliary flow supplies the secondary column 80' with carrier gas, the primary column effluent may enter the modulator through the primary tee 30' and may flow through the loop 50' toward the exhaust tee 20' at a flow rate of F1. Unlike an RFF modulator, the primary effluent may not be diluted with the curtain gas during the load state. This may ensure that analyte concentration is not diminished by the modulation process. The primary effluent may continue to flow through the loop 50' until eventually reaching the exhaust tee 20' where it may combine with the curtain flow. The merged flows may pass through the flow restrictor 90' and may exit the modulator at a flow rate of Fx, which may be related to the other external flow by $Fx=F1+Fs-F2$.

Figure 10:
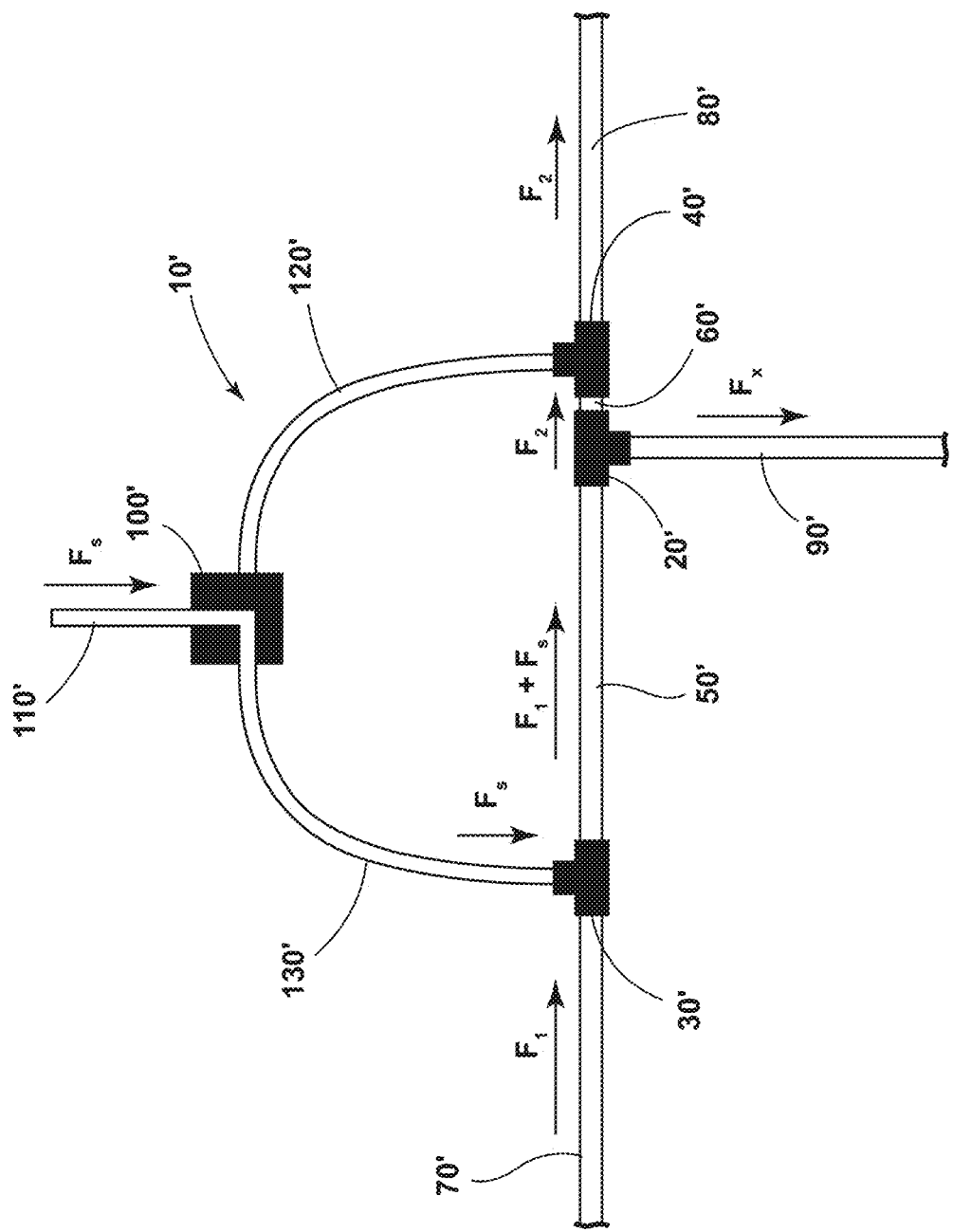
FIG. 10 is a schematic of a flow pattern associated with an inject state in connection with an embodiment a modulator according to aspects and teachings of the present disclosure.

An example flow pattern associated with an inject state is generally illustrated in FIG. 10. The inject state may be generated by energizing the valve 100', which may direct the auxiliary flow to the primary tee 30'. The auxiliary flow and the primary flow may combine within the primary tee 30' and may move (e.g., rapidly) through the loop 50', such as at a rate of F1+Fs. When this flow reaches the exhaust tee 20', it may split into two stream portions. A first portion with a flow rate of F2 may pass through the joining tube 60' to the secondary tee 40' and may ultimately enter the secondary column 80'. A second portion may exit the exhaust tee 20' at a flow rate of $Fx=F1+Fs-F2$ and may pass through the flow restrictor 90'.

Embodiments of a modulator may be configured to create a fluid stream that contains short, undiluted segments of primary effluent separated by larger segments of carrier gas. The modulator may achieve this, at least in part, by controlling of the magnitudes of the incoming and outgoing flows and/or by controlling of the timing of switching between the load and inject states. An example of dynamic modulation is generally illustrated in FIGS. 11-14. Undiluted primary effluent is identified in the figures as fill by hatch marking, and the carrier gas is shown as a white fill.

By way of example and without limitation, the external flows are given by F1=1.0 mL/min, F2=10.0 mL/min, Fs=15.0 mL/min, and Fx=6.0 mL/min (approximately). The internal flows can be deduced from the magnitude of the external flows and the state of the device. Both the external flows and internal flows are generally included in FIGS. 11-14.

Figure 11:
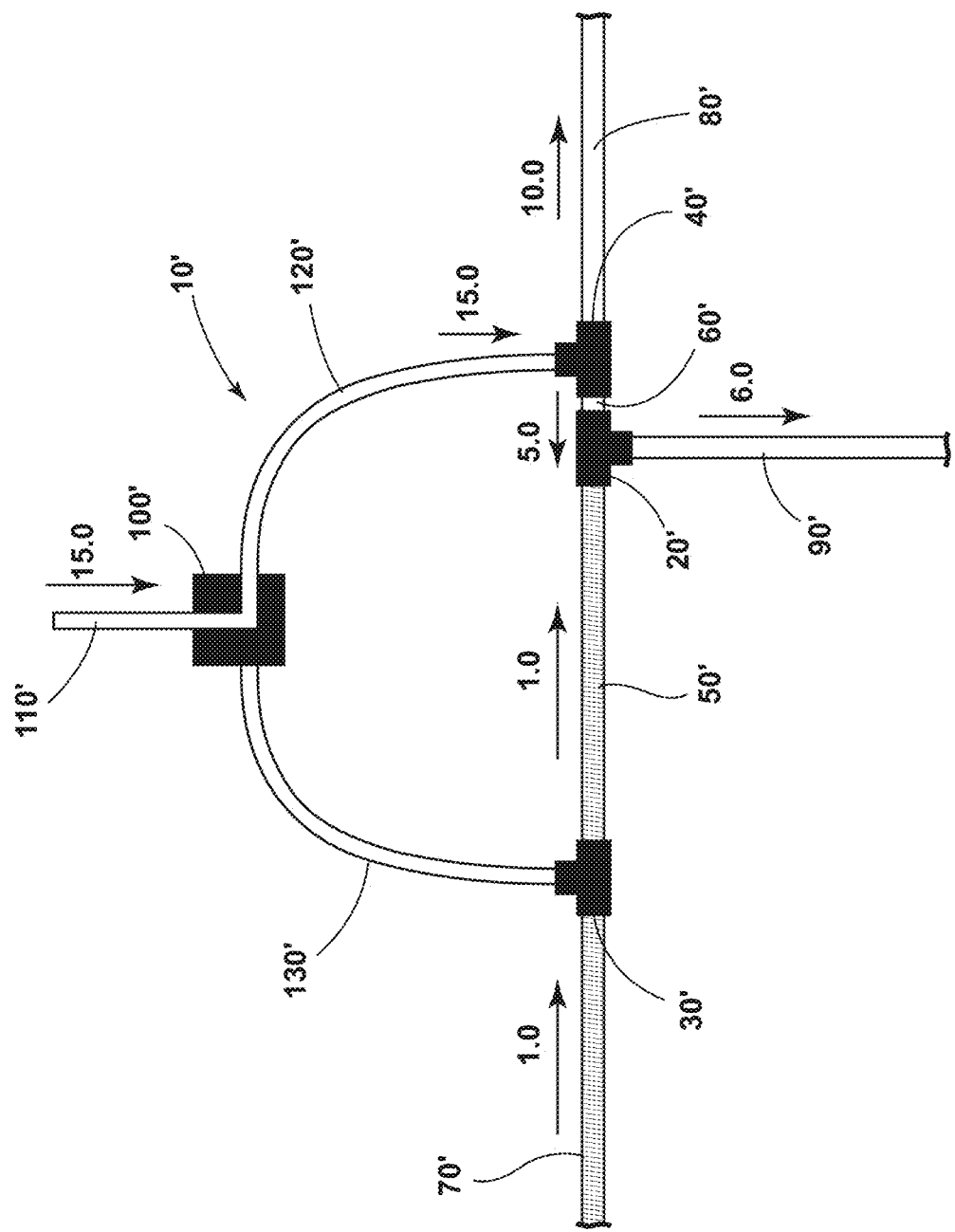
FIGS. 11-14 generally illustrate schematic embodiments of a modulator configured for dynamic modulation according to aspects and teachings of the present disclosure.

The starting point of a modulation cycle may be considered to be the point where modulator has been held in the load state for a sufficient length of time such that the primary effluent has filled the entire loop 50' and a small portion of the effluent has overfilled the loop 50' and begun exiting the modulator through the flow restrictor 90'. Such a starting point is generally illustrated in FIG. 11.

Figure 12:
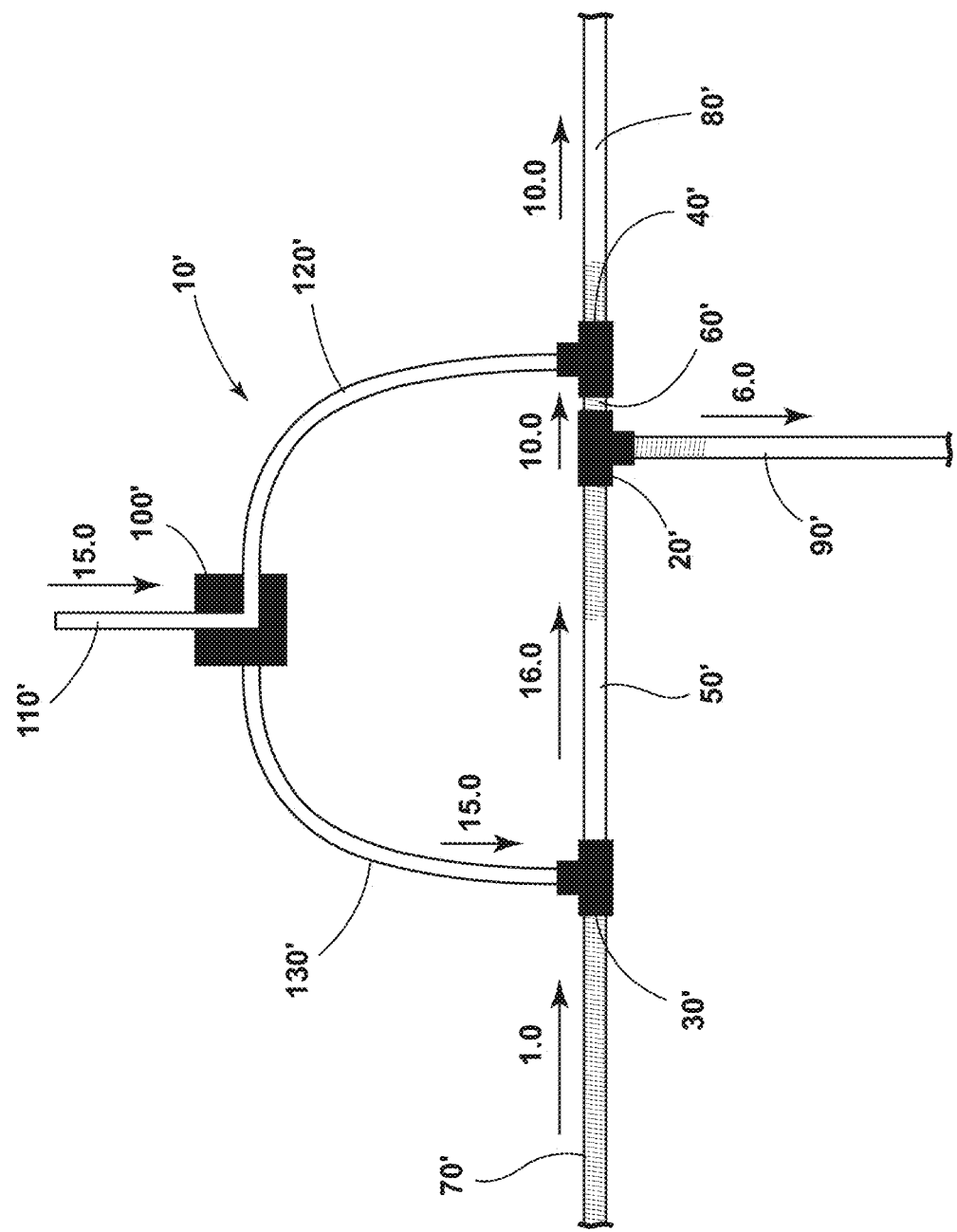

After the loop 50' is filled, the valve 100' may be switched to place the device into the inject state. FIG. 12 generally illustrates an example situation shortly after entering the inject state. The auxiliary carrier now enters at the primary tee 30' where it combines with the incoming primary effluent, such as to make a high flow of 16 mL/min that may rapidly push the plug of undiluted primary effluent through the exhaust tee 20' where it may split between the joining tube 60' and the flow restrictor 90'.

Figure 13:
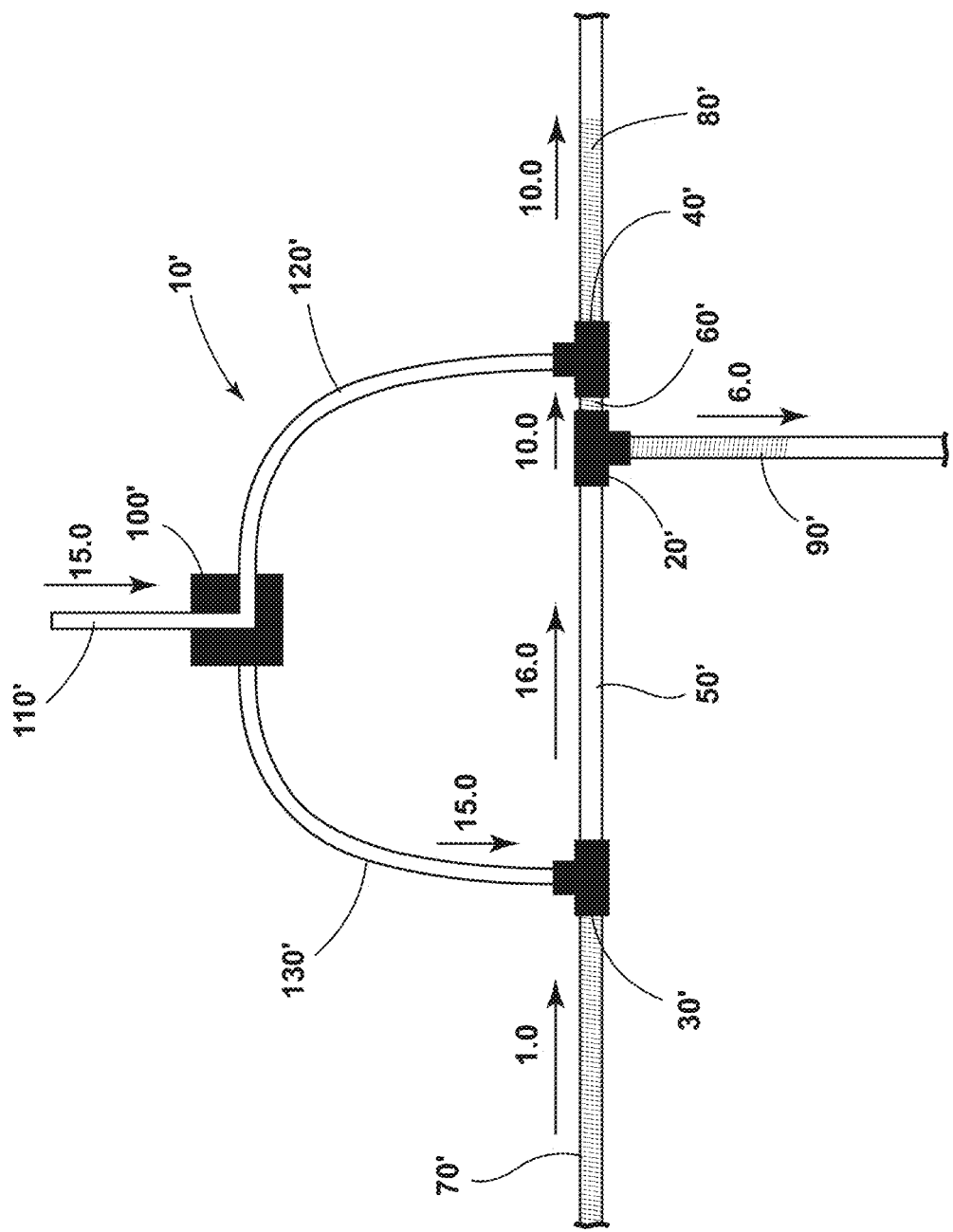

FIG. 13 generally illustrates an example of a final moment of the inject state. The auxiliary flow may have pushed most but not all of the undiluted primary effluent out of the loop. Most of the primary effluent that entered the joining tube 60' may have travelled to the secondary column 80'. Once the modulator has transferred the desired segment of primary effluent to the secondary, the modulator may be returned to the load state.

Figure 14:
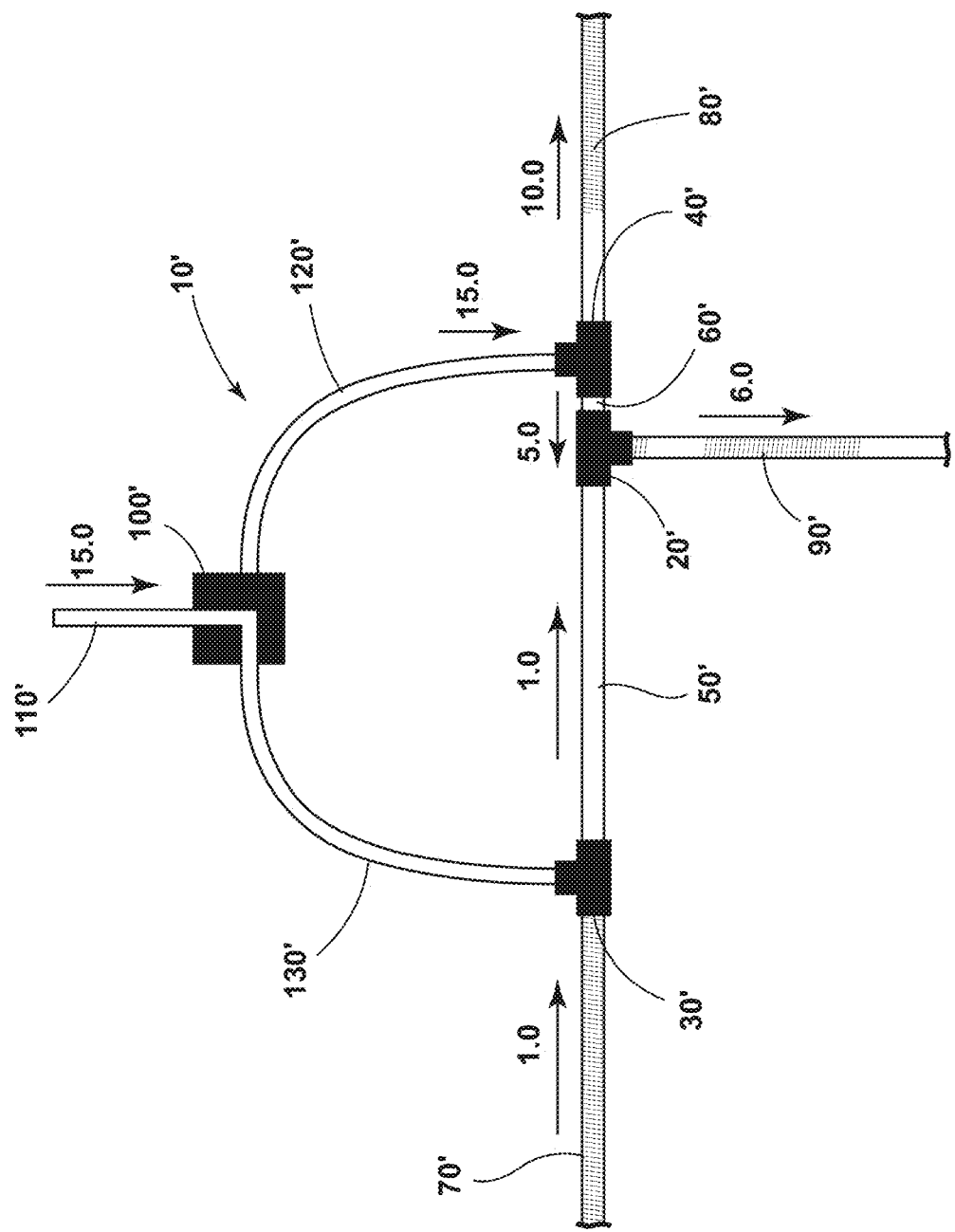

FIG. 14 generally illustrates an example situation shortly after returning to the load state. In an example, an auxiliary flow (e.g., 15.0 mL/min) may enter at a secondary tee where a portion (e.g., 10.0 mL/min) may continue to push the undiluted effluent segment down the secondary column 80'. The remaining portion (e.g., 5.0 mL/min) of auxiliary flow may act as a curtain flow that may prevent the entry of additional primary effluent and/or purge the contents of the joining tube 60' out of the modulator through the flow restrictor 90'. Meanwhile, undiluted primary effluent may begin refilling the loop 50'. The device may be held in the load state until the loop 50' is entirely filled (see FIG. 11) and the cycle may be repeated.

In contrast to an RFF modulator, for example, the curtain gas in embodiments of modulators may not dilute the collected primary effluent. Thus, embodiments of a modulator may operate without penalty with a higher curtain gas flow. Higher curtain flow may allow the device to more quickly and more completely switch between the load and inject states. This may enable the modulator to produce narrow pulses (e.g., extremely narrow pulses) with abrupt front and back edges.

Figure 15:
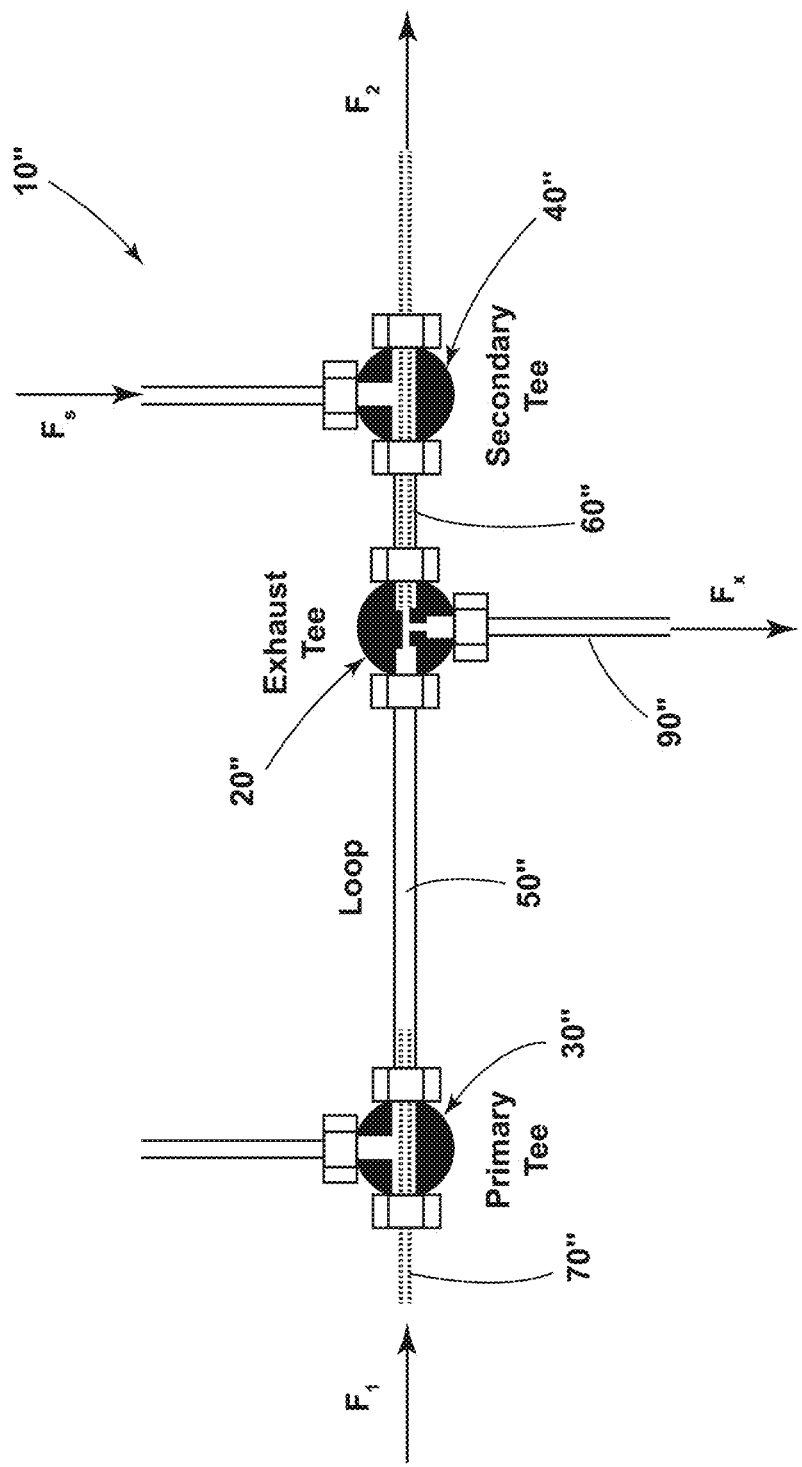
FIG. 15 is a schematic of an embodiment of a modulator according to aspects and teachings of the present disclosure.

A schematic of an embodiment of a modulator 10" is generally illustrated in FIG. 15. The modulator may include three tee unions. In some embodiments, the peripheral tee unions (e.g., the primary tee 30" and secondary tee 40") may have internal bores (e.g., 0.5 mm internal bores) and the internal tee union (e.g., the exhaust tee 20") may have a different sized internal bore (e.g., 0.25 mm internal bore). The loop 50" and joining tube 60" may include lengths of metal capillary tubing that may have a deactivated internal surface and an internal diameter of 0.53 mm, for example and without limitation. The loop 50" may be disposed between the primary tee 30" and the exhaust tee 20". A loop 50" may have a length of about 5.0 cm or about 12.5 cm, for example and without limitation. The joining tube 60" may, for example, be about 2.5 cm long and/or situated between the exhaust tee 20" and the secondary tee 40". The valve 100" may, for example, comprise a high-speed, miniature, 3-port solenoid valve and/or may be connected to the primary and secondary tees 30", 40" with lengths (e.g., 12 cm) of a transfer line (e.g., an MXT transfer line). The remaining port of the exhaust tee 20" may, for example, be connected to a backpressure regulator.

In examples, hydrogen may be used as the carrier gas. The auxiliary carrier gas flow Fs may be controlled with a mass flow meter. The output of the mass flow meter may be provided to a common port of a valve (e.g., a solenoid valve). The state of the valve may determine the state of the modulator. The load state of the modulator may be created when the valve directs the auxiliary gas flow to the secondary tee (e.g., as generally illustrated in FIG. 15). The inject state may be created by actuating the solenoid valve such that the auxiliary flow is instead directed to the primary tee.

With embodiments, the primary column may be inserted through the primary tee into the upstream end of the loop. A coaxial arrangement of the primary column and the loop may allow the effective loop length to be changed by adjusting the insertion depth of the primary column. The effective loop length may correspond to the distance from the tip of the primary column to the downstream end of the loop (e.g., the entrance to the exhaust tee).

In embodiments, the secondary column may be inserted through secondary tee into the joining tube. The secondary column may be pushed through the entire length of the joining capillary until it touches the exhaust tee. The secondary column may then be withdrawn slightly (e.g., approximately 1 mm). This arrangement may create an extremely short effective joining tube length of about 1 mm.

Coaxial arrangements of the primary column with the loop and the secondary column with the joining tube may allow the effective lengths of the loop and joining tube to be adjusted. This may allow for, inter alia, properly tuning the modulator, which can be especially useful in the early stages of modulator development for a new or given application. The effective length of the loop can be decreased to ensure that the loop is overfilled during the load stage or increased (if needed) to ensure that it is not fully flushed in the inject stage. Overfilling and under-flushing of the loop may be desirable because it may allow the switching action of the modulator to create sharp edges on the outgoing pulse.

Figure 16B:
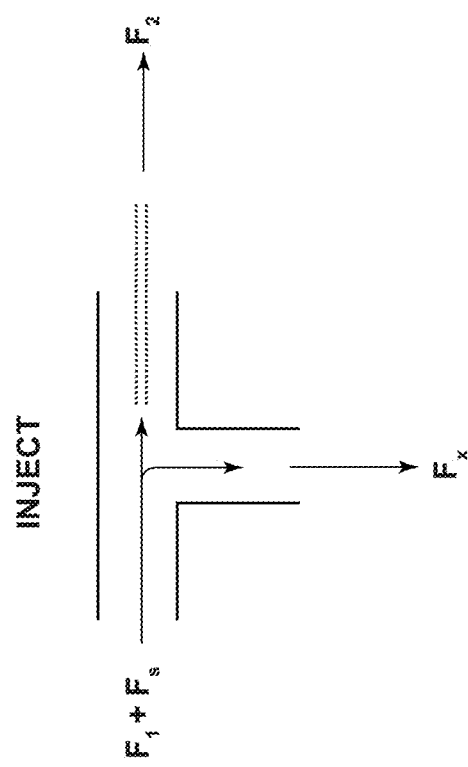
FIGS. 16A and 16B generally illustrate enlarged views of example flow patterns that may occur in an exhaust tee region near the tip of a secondary column.
Figure 16A:
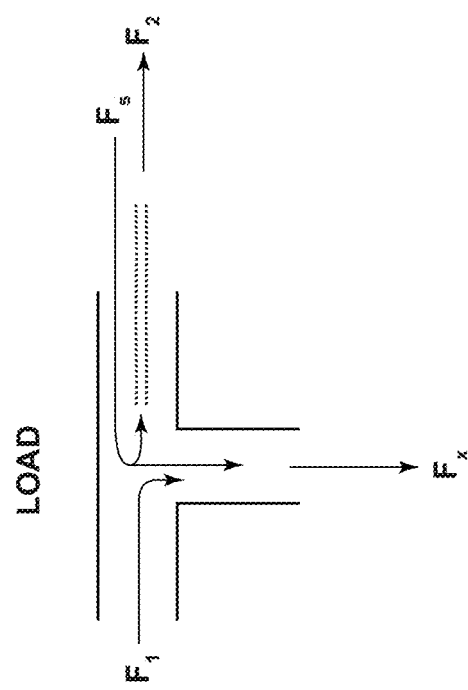

A coaxial arrangement of the secondary column with the joining tube may allow the effective length of the joining tube to also be adjusted. Adjusting the effective length of the joining tube may be desirable because it may be desirable for the length of the joining tube should be as short as possible without allowing primary effluent to diffusively bleed into the secondary column during the load state. FIGS. 16A and 16B generally illustrate enlarged views of example flow patterns that may occur in the exhaust tee region near the tip of the secondary column. FIG. 16A generally illustrates an example flow pattern during the load state. The auxiliary carrier flow Fs may enter at the secondary tee and then flow through the joining tube in the annular region that may be created in the space between the internal walls of the joining tube and the external surface of the secondary column. The auxiliary flow may pass over the tip of the secondary column with a portion (e.g., F2) entering the secondary column and the remainder may flow further into the exhaust tee and ultimately exit through the flow restrictor. This remaining flow may be the curtain flow Fc=Fs−F2, and the curtain flow may prevent the primary flow F1 from being able to enter the secondary column in the load state. However, if the secondary column is inserted too far toward the exhaust tee, then the curtain flow may not have a sufficient distance to prevent the primary effluent from diffusing against the curtain flow current and reaching the secondary column. The ideal effective joining tube length may be established by first fully inserting the secondary column into the exhaust tee (e.g., an effective joining tube length of 0) then withdrawing the secondary column until no bleed is observed. A benefit of operating at the minimum effective joining tube length (maximum insertion depth) can be seen by examining the flow patterns present during the inject state (see, e.g., FIG. 16B). When the modulator enters the inject state, the auxiliary carrier may be introduced at the primary tee and primary effluent collected in the loop may enter the exhaust tee at a flow rate of Fs+F1. Operating at the minimum effective joining tube length may allow the primary effluent to reach the entrance of the secondary column almost immediately after switching to the load state. Thus, with embodiments, there may be very little time lag produced by the modulator and it may be used to precisely control the widths of extremely narrow pulses.

Figure 17:
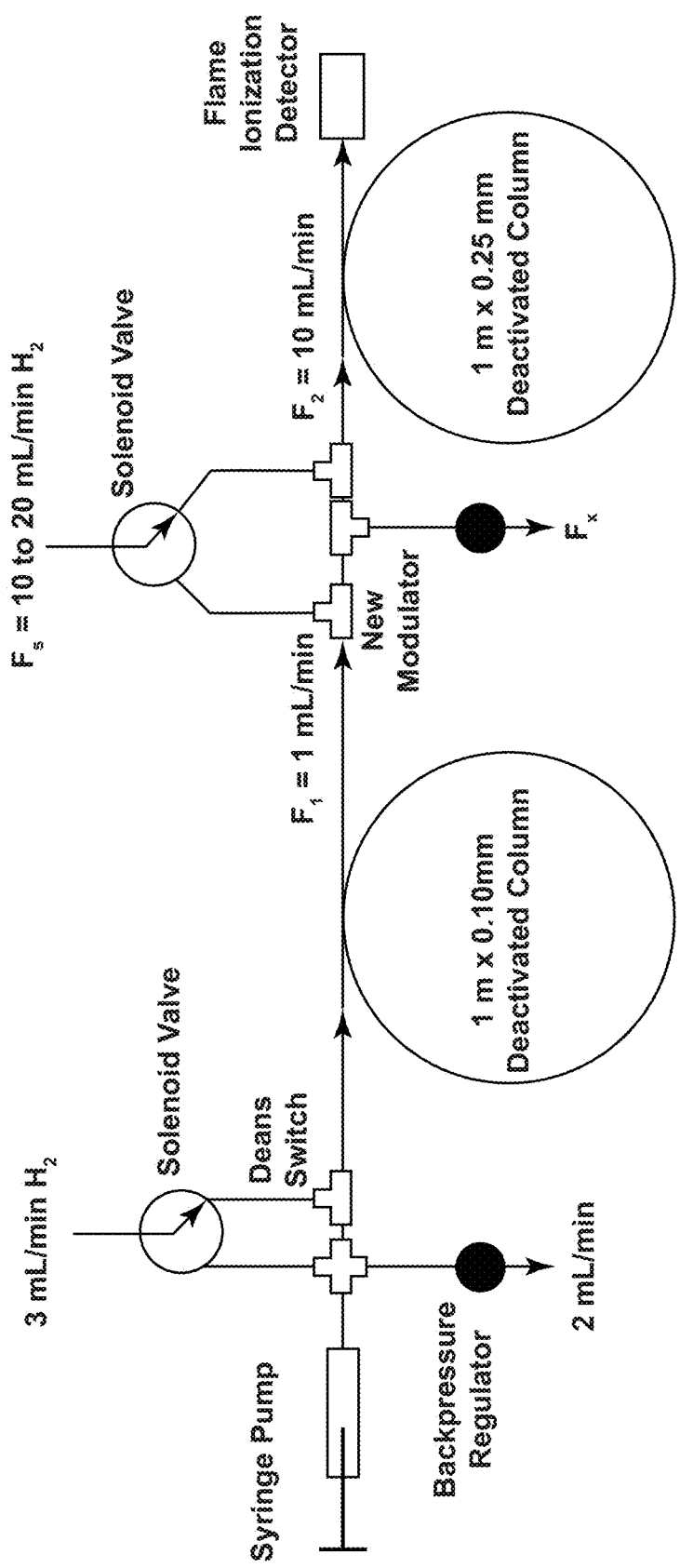
FIG. 17 is a schematic of an embodiment of a testing apparatus that may be used in connection with aspects and teaching of the present disclosure.

A schematic of an embodiment of a testing apparatus is generally illustrated in FIG. 17. The left half of the system may, for example, be used for creating a stream of dilute pentane in hydrogen. A mass flow controller may be used to introduce a 3 mL/min flow of hydrogen carrier gas to a 3-port, 2-way solenoid valve, for example and without limitation. The output ports of the solenoid valve may be connected to a switch (e.g., a Deans switch) that may have a cross/tee construction. A cross port of the Deans switch (the exhaust port) may be connected to a backpressure regulator. A downstream tee port may, for example and without limitation, be connected to a 1 m×0.1 mm piece of deactivated fused silica capillary. By way of example and without limitation, with some embodiments the backpressure regulator may be adjusted such that, for instance, 2 mL/min of H2 flows out of the exhaust port and 1 mL/min of H2 passes through the fused silica column. With some embodiments, liquid pentane may be injected (e.g., with a syringe pump) into a switch (e.g., Deans switch) at a rate of, for example, 0.4 uL/hr. The state of the switch may be determined by a state of the solenoid valve. When the switch directed the carrier gas to the tee fitting, all of the injected pentane may be forced through the exhaust port and not allowed to enter the fused silica column. If the switch directs carrier gas to the cross fitting, one third of the injected pentane may be allowed enter the fused silica column. In this way, the left half of the system may allow for accurately simulating primary effluent from a GC×GC separation: for example and without limitation, a steady stream of 1.0 mL/min flow of H2 may be created and passed through a capillary column with the ability to turn on and turn off the added pentane.

The right side of FIG. 17 represents a modulator portion of an example of an apparatus. The primary column may be inserted into the primary tee of the modulator. The value of the auxiliary flow may be controlled by a mass flow controller and may, for example and without limitation, range from 10 to 20 mL/min. A length of deactivated fused silica (e.g., 1 m×0.25 mm) may serve as a secondary column. A backpressure regulator may be connected to the exhaust port of the exhaust tee and may be adjusted to generate a flow of, for example, 10 mL/min through the secondary column. The modulated pentane pulses may be detected by a high-speed flame ionization detector (FID) that may be housed inside a gas chromatograph (e.g., Perkin-Elmer AutosystemXL). The timing of actuation of the switch and the modulator may be controlled by one or more controllers, such as two independent microprocessor circuits. By way of example and without limitation, a system or apparatus may be operated with an auxiliary flow of Fs=14.4 mL/min. This value, when combined with F1=1 mL/min and F2=10 mL/min, may lead to a curtain flow of Fc=4.4 mL/min and an exhaust flow of Fx=5.4 mL/min.

Figure 18:
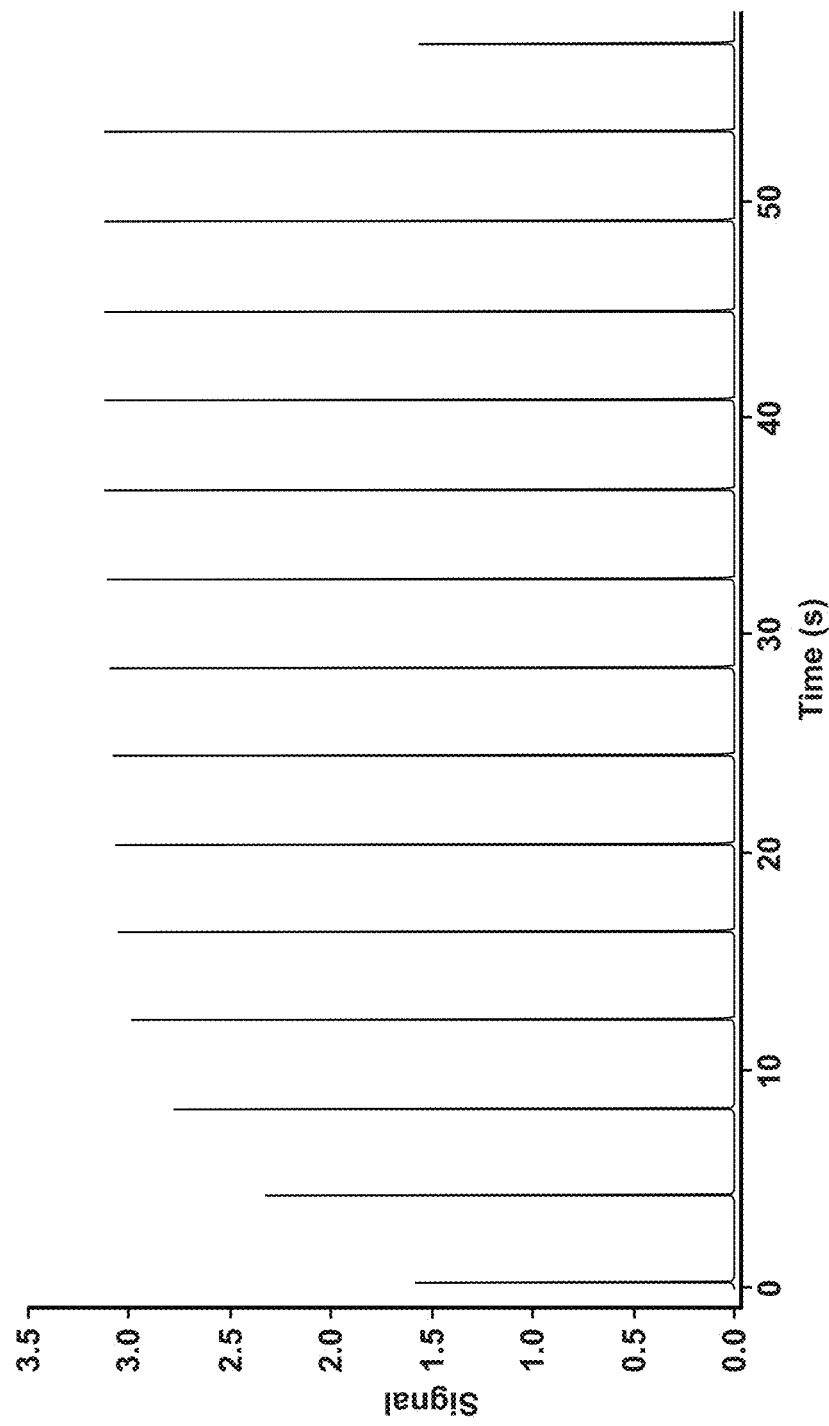
FIG. 18 generally illustrates an example of a portion of an obtained signal array.
Figure 19:
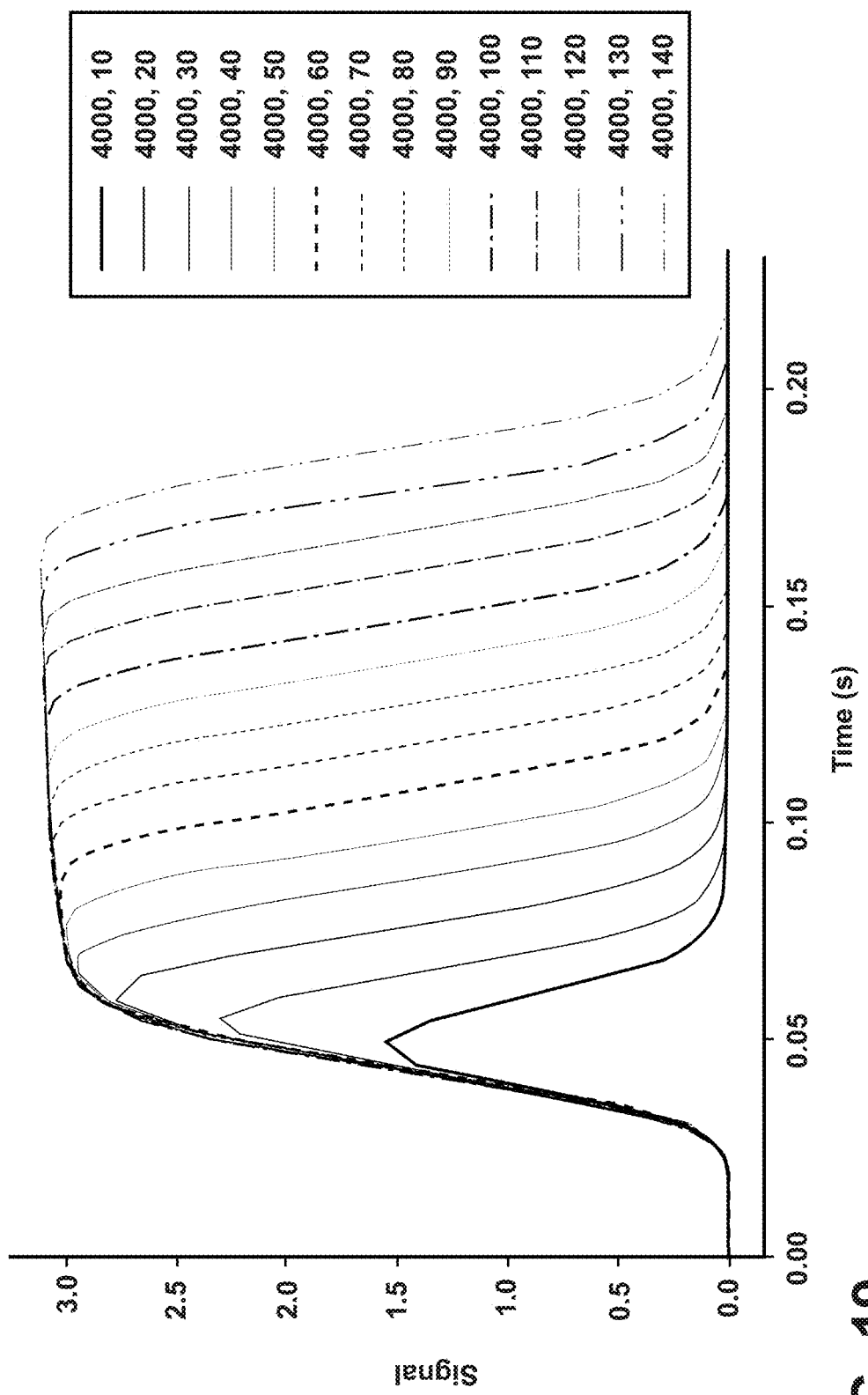
FIG. 19 generally illustrates an example of an overlay plot of pulses.
Figure 20:
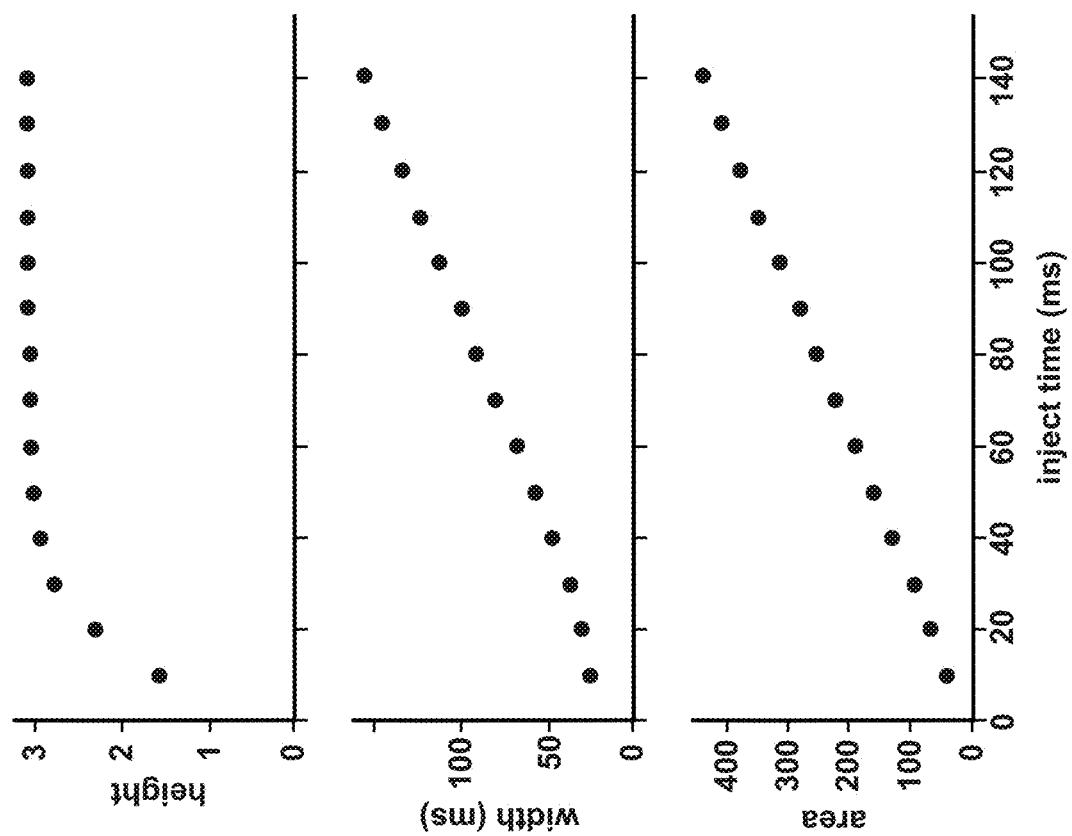
FIG. 20 includes examples of plots of height, width, and area of pulses as a function of inject time.

In examples, a test may be conducted with, for example and without limitation, a 12.5 cm long loop (e.g., instead of the normal 5.0 cm loop). The modulator may be held in a load state for a period of time (e.g., about 4 seconds) and the time spent in the inject state (e.g., the inject time) may be varied from 10 to 140 ms in 10 ms increments, for example. This may lead to the production of a series of pulses of increasing width separated by a period of time (e.g., approximately 4 s). FIG. 18 generally illustrates a portion of an obtained signal array. An overlay plot of the pulses is generally illustrated in FIG. 19. As generally illustrated, the pulses may initially increase in both height and width when the inject time is increased (e.g., from 10 ms to 40 ms). When the inject time is increased to greater values (e.g., values greater than 40 ms), the widths may continue to increase, but the pulse heights may not increase. This effect can be generally observed in FIG. 20, which shows a plot of the height, width, and area of the pulses as a function of inject time. FIG. 20 can confirm what can be seen from visual inspection of the pulses, i.e., that the pulse height plateaus (e.g., at inject times greater than 40 ms), but the widths continue to grow in direct proportion to the inject time. The widths of the peaks may correspond with the inject time to within 5%. Thus, the pulses do not exhibit significant broadening on the short secondary column and the primary effluent may pass through the gap almost instantaneously during the load state. FIG. 20 also demonstrates that pulse area may be directly proportional to inject time. This may be expected for cases when the inject time is not great enough to fully flush the primary effluent out of the loop. Inject times greater than, for example, 40 ms may lead to wider peaks but not taller peaks (at least when using a 1 m×0.25 mm uncoated secondary column). A modulator that can inject narrow pulses may be desirable for a number of applications.

Figure 21:
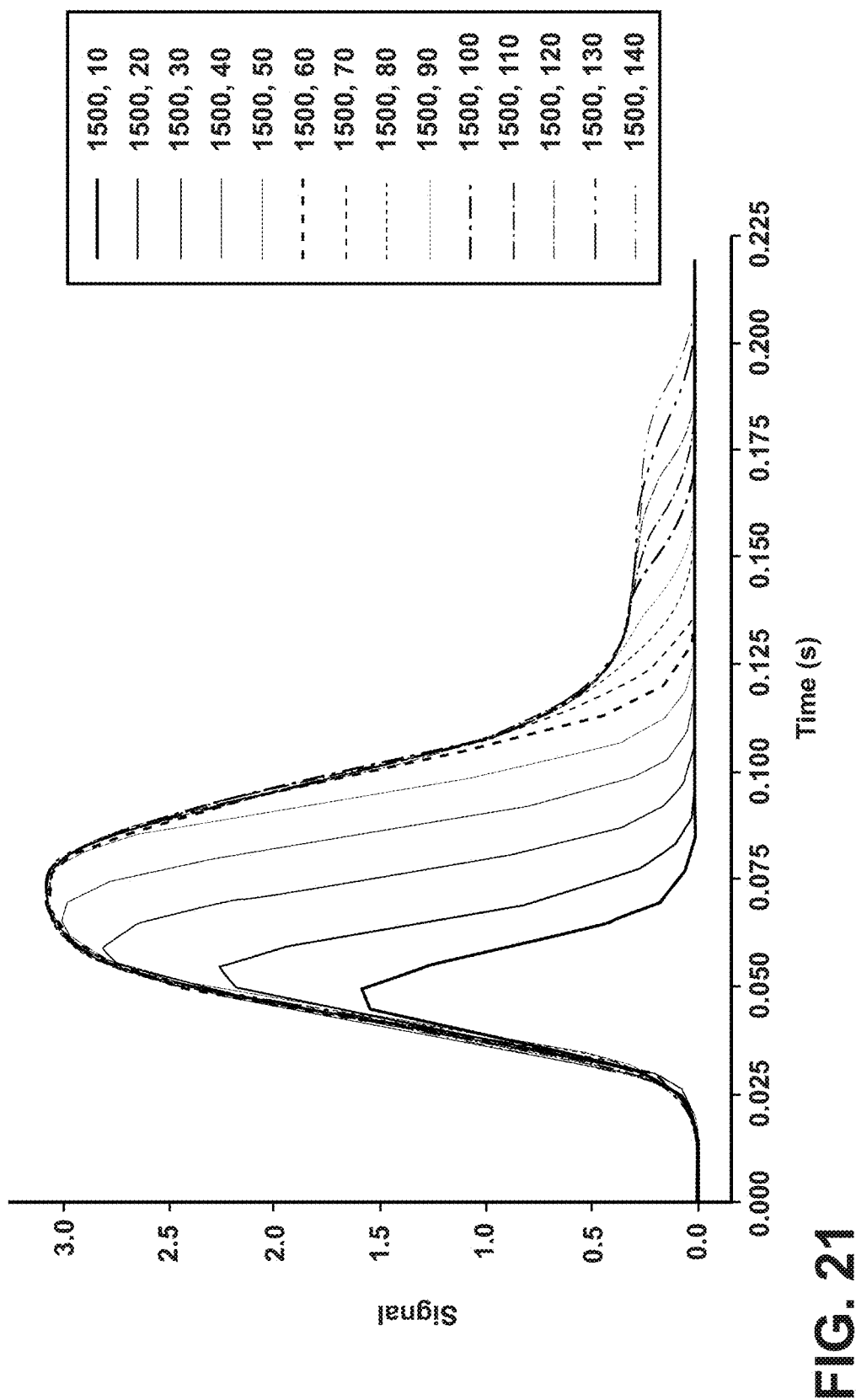
FIG. 21 is an example of a pulse signal plot as a function of time.
Figure 22:
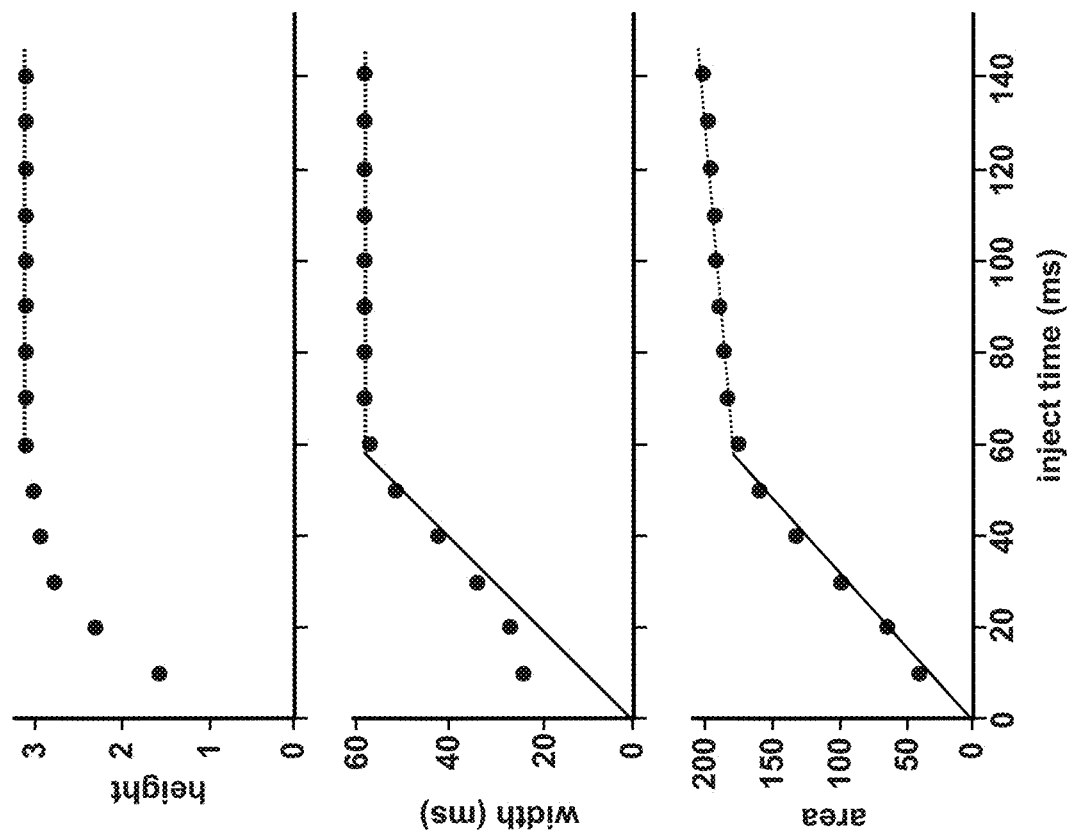
FIG. 22 is an example of a plot of pulse statistics (height, width, and area) as a function of inject time.

If modulating with inject times near 40 ms, the loop (e.g., a 12.5 cm loop) may be too large. A smaller loop (e.g., 5.0 cm long loop) may be used instead. The modulator may be held in the load state for a period of time (e.g., 1.5 s), as less time may be involved to fill the loop, and the inject time may be varied for a period of time in increments (e.g., from 10 ms to 140 ms in 10 ms increments). A pulse overlay plot is generally illustrated in FIG. 21. With the prior configuration, the pulse height may essentially plateau as the inject time is increased (e.g., above 40 ms). With this configuration, the pulse width may plateau when the inject time is increased (e.g., above 60 ms). Larger inject times may not increase the width of the pulse but may increase the extent the pulse's trailing shoulder, which may be a result of it taking time (e.g., approximately 60 ms) to flush out the loop (e.g., 5 cm loop). After a period of time (e.g., 60 ms) in the inject state, the source of pentane may no longer be primary effluent that was collected during the preceding load state, but may instead be primary effluent that enters during the current inject state. The signal intensity of the trailing shoulder may be lower because the pentane that enters the loop during the inject state may be diluted by auxiliary carrier gas (see, e.g., FIG. 12). The pulse statistics are plotted as a function of inject time in FIG. 22. The peak height may plateau after a period of time (e.g., after 40 ms). The width may plateau at a value (e.g., approximately 58 ms) for inject times greater than, for example, 60 ms. The pulse area may increase in direct proportion to inject time until the loop is fully flushed (e.g., at or about 60 ms). After that point, the area may increase more slowly, such as due to the extension of the low intensity trailing shoulder of the pulse. For example and without limitation, sharp, symmetric pulses may be obtained when using about a 5 cm long loop (under the current flow conditions) when the inject time is less than or equal to at or about 60 ms.

Figure 23:
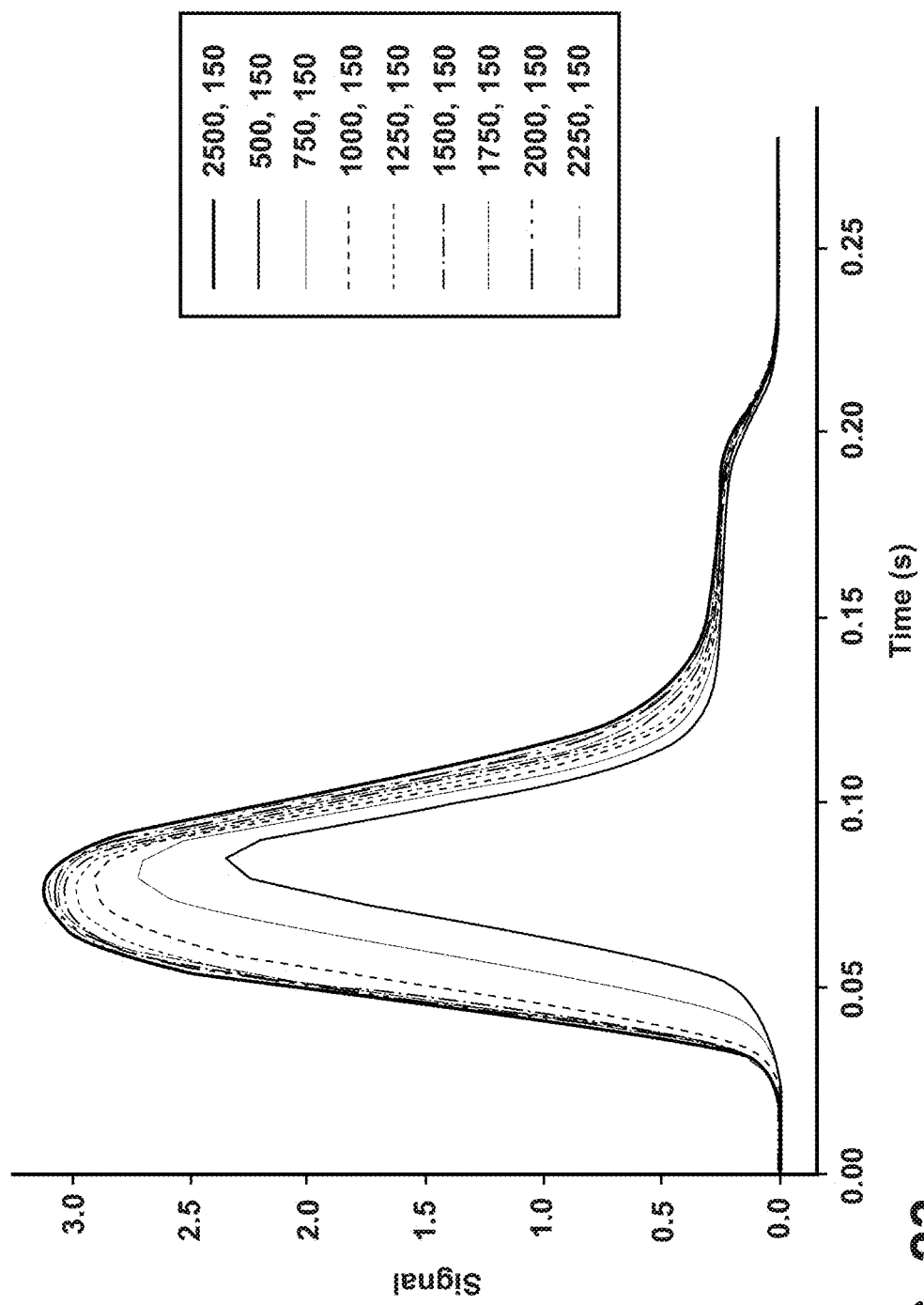
FIG. 23 is another example of a pulse signal plot as a function of time.

With examples, the modulator may be designed to produce the best (or an optimal) pulse shape when the loop is allowed to overfill during the load state. A test apparatus may be used to study the effect of the extent of loop filling during the load state. By way of example and without limitation, a test apparatus may include a 5.0 cm long loop and the inject time may be held at 150 ms, while the load time may be varied from 500 ms to 2500 ms in 250 ms increments. An example of a pulse overlay plot is included in FIG. 23. As the load time is increased, the front edge of the pulse may move leftward (e.g., to shorter arrival times), such as due to the increased filling of the loop. The front edge of the pulse may assume a consistent shape for certain load times (e.g., of 1.25 s and greater), which may indicate that it takes a period of time (e.g., approximately 1.25 s) to begin overfilling the loop under the current conditions. As the load time is increased, the back edge may move rightward. This can be due, at least in part, to the diffusion of primary effluent into un-swept regions of the primary tee during the load state. As the load time is increased, the primary effluent may diffuse further from the loop entrance. This may be avoided by using an inject time less than the widths of the pulses so that the back edge is clipped, which may be an advantage of under-flushing the loop.

Figure 24:
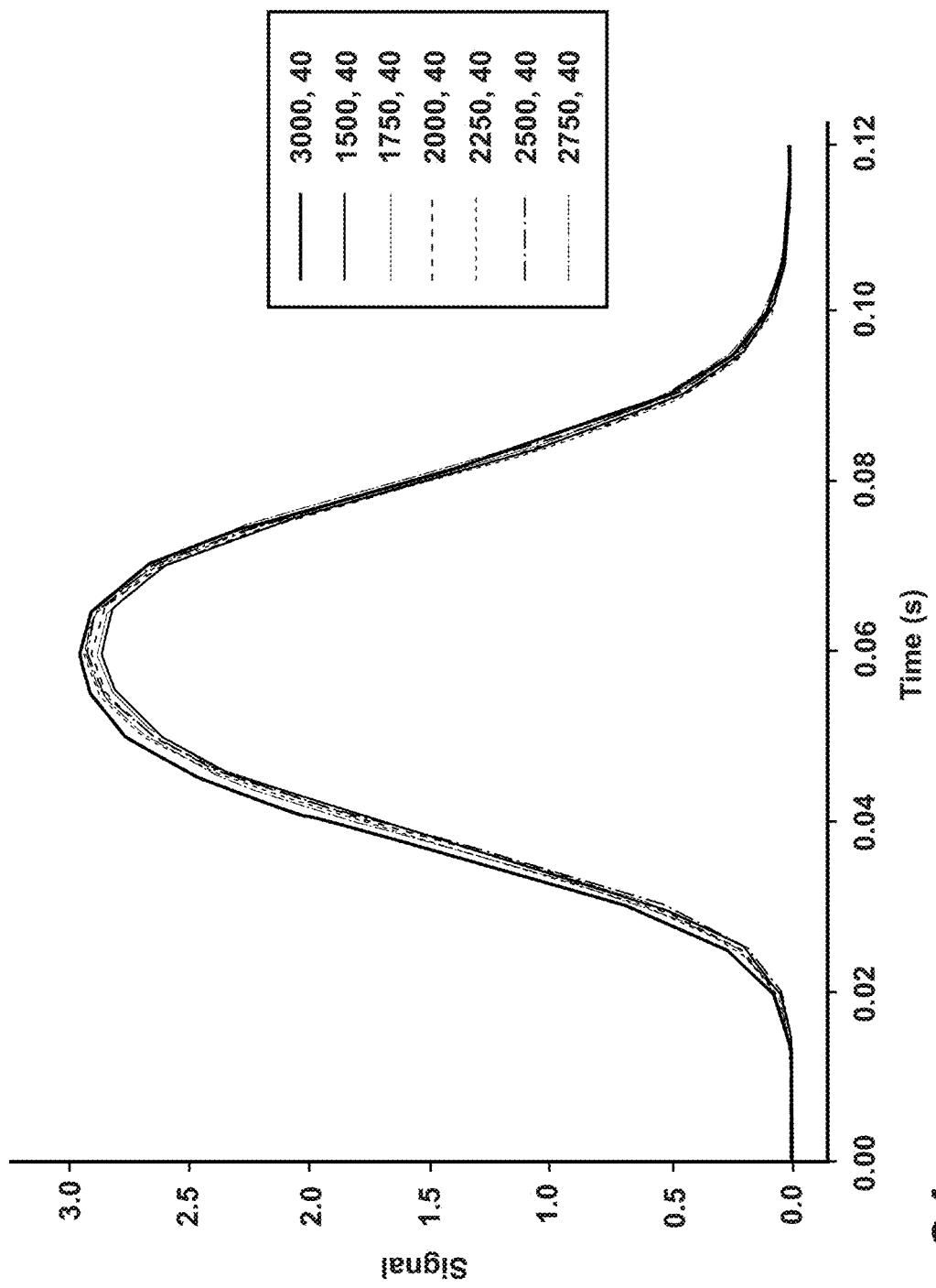
FIG. 24 is another example of a pulse signal plot as a function of time.

In embodiments, the modulator (under the current flow conditions with, for example, a 5 cm loop) may generate an ideal and/or consistent pulse shape for an inject time (e.g., 60 ms or less), with under-flushing the loop, and load time (e.g., 1.25 s or greater), with overfilling the loop. By way of example and without limitation, pulses produced with an inject time of 40 ms may be compared with load times ranging from 1.5 s to 3.0 s in 0.5 s increments. An example of a resulting pulse overlay plot is included in FIG. 24. All seven pulses are almost perfectly overlapping, which demonstrates a reproducibility generated when operating with overfilling/under-flushing conditions. Overfilling/under-flushing may provide the added benefit that the abruptness of the pulse edges may be determined by the environment in the immediate vicinity of the entrance of the secondary column. Thus, unswept volumes in the primary tee or exhaust tee may have little effect on the pulse shape.

With examples, an auxiliary carrier gas may serve at least two functions in the fluidic modulators: (i) supplying the secondary column with carrier gas, and (ii) producing a curtain flow that may prevent primary effluent from entering the secondary column during the load state.

Figure 25:
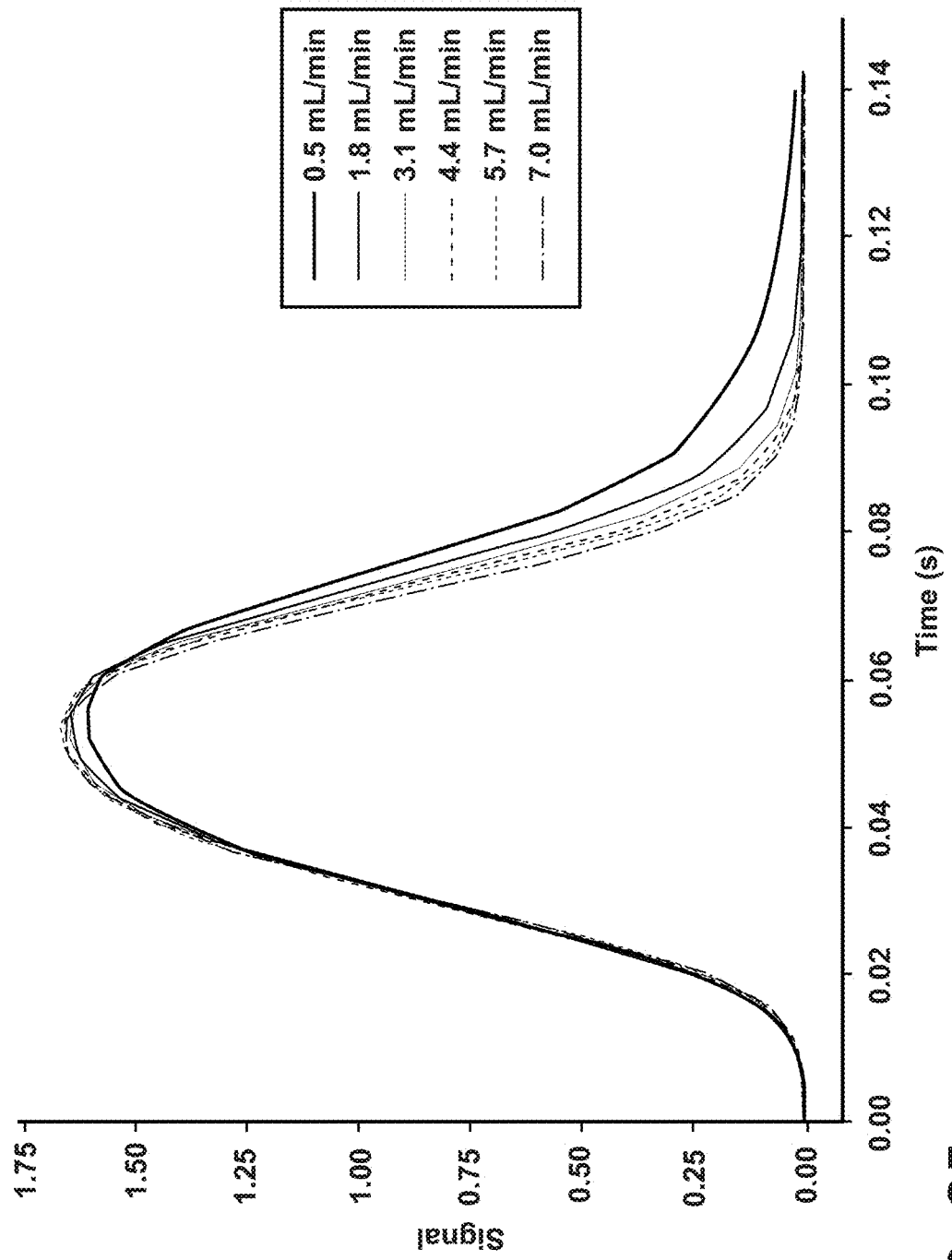
FIG. 25 is another example of a pulse signal plot as a function of time.

A potential advantage of embodiments of a modulator may include that the curtain gas may not dilute the primary effluent collected in the loop. Pulses may be generated with auxiliary carrier gas flows ranging from, for example, 10.5 mL/min to 17.0 mL/min. For a secondary column flow of, for example, 10.0 mL/min, this may correspond to curtain flows ranging from 0.5 mL/min to 7.0 mL/min. While the magnitude of the input flows may be accurately measured, it may be more difficult to accurately measure the curtain flow. Curtain flow may increase with increasing auxiliary carrier flow and/or the actual value of the curtain flow may only be estimated. For example and without limitation, an inject time may be set at 40 ms and the load time may be 1460 ms. An example of a pulse overlay plot is included in FIG. 25. The pulse produced with the lowest curtain flow may have the highest amount of tailing. This can be because there may be less curtain flow pushing the primary effluent back from the entrance of the secondary column immediately after the modulator is switched from inject to load. The tailing may decrease as the curtain flow is increased. Once the curtain flow reaches a certain flow, for example, 3.1 mL/min, further increases in the curtain flow may not make appreciable changes to the pulse shape (e.g., with a curtain flow of 4.4 mL/min). Increasing curtain flow may not alter peak intensity, so users may adjust the auxiliary flow of carrier gas to be significantly higher than the secondary column flow (e.g., 4 to 8 mL/min higher) and may still obtain sufficient peak shape and maximum signal intensity.

Figure 26:
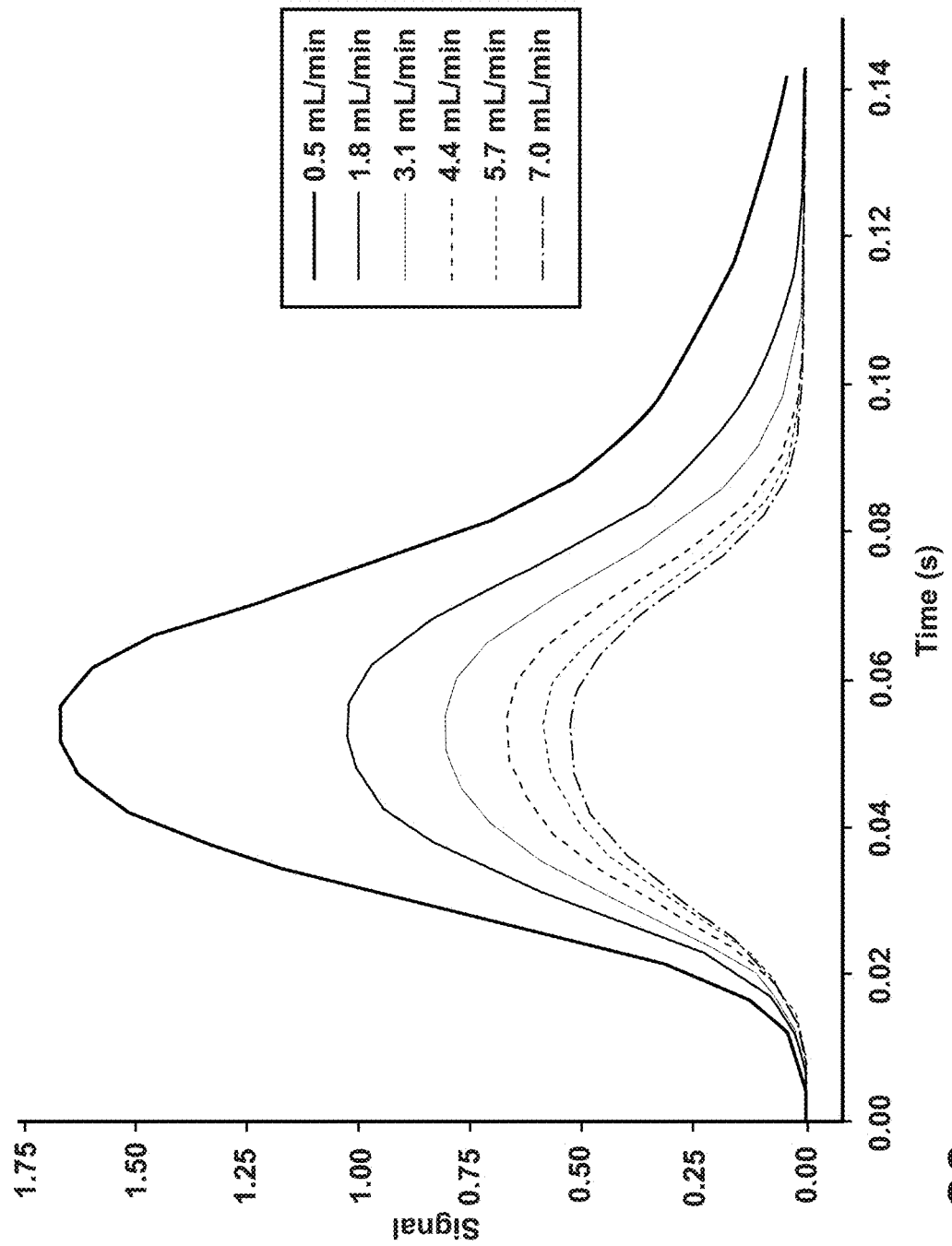
FIG. 26 is an example of a pulse signal plot as a function of time for an embodiment of an RFF modulator.

Independence of peak intensity from the curtain gas flow rate may be an advantage of embodiments of modulators, such as compared to reverse fill/flush modulators. For example and without limitation, an embodiment of a modulator such as shown in FIG. 15 may be converted to an embodiment of an RFF modulator by changing (e.g., swapping) the position of the primary column 70" and the flow restrictor 90". A pulse overlay plot for such an RFF modulator embodiment is included in FIG. 26. In the case of an RFF modulator, increasing the curtain flow may decrease the tailing of the pulse, but the pulse intensity may be less for the RFF modulator, even at the lowest curtain flow, and the pulse intensity may decrease significantly as the curtain flow is increased. In some circumstances, the pulse intensity when the curtain flow is, for example, 7.0 mL/min may be nearly a factor of 10 lower than what may be produced by embodiments of a modulator. The decrease in pulse intensity with increasing curtain flow observed with the RFF modulator may be because the flow patterns of the RFF cause the curtain flow to dilute the primary effluent as it is collected in the loop. Notably, data (such as in FIG. 26) indicates that an RFF mode of modulation can be readily achieved with a different embodiment, such as illustrated in FIG. 15, by swapping the positions of the primary column and flow restrictor. Such novel embodiments of an RFF modulator can provide advantages over other RFF-type modulators because of, inter alia, a coaxial nature/configuration of the secondary column with a joining tube, and a coaxial nature/configuration of a flow restrictor and a loop. Among other things, the coaxial nature/configuration of such conduits can permit effective lengths of a joining tube and/or a loop to be adjusted simply by changing an insertion depth with a secondary column and/or a flow restrictor.

Embodiments of a modulator may be used to perform a GC×GC separation, such as of gasoline. The modulator may be mounted in a gas chromatograph (e.g., Agilent 7890). A 15.0 m×0.25 mm×0.50 um DB-1 column may serve as the primary column, and a 5.0 m×0.25 mm×0.25 um Stabilwax column served as the secondary column, for example and without limitation. Hydrogen may be used as the carrier gas. By way of example and without limitation, a 0.5 uL quantity of gasoline may be injected through a split inlet (100:1 split) held at 250° C. The split inlet may provide a 1.0 mL/min primary column flow. An auxiliary carrier gas flow of 15 mL/min may be provided to the modulator by a pneumatics control module (PCM). A backpressure regulator associated with the PCM may be connected to the exhaust port of the modulator and used to establish a 10 mL/min secondary column flow and thus a curtain flow of 5.0 mL/min. The modulator may be operated with an inject time of 30 ms and a load time of 1470 ms to yield a 1.5 s modulation period.

Mixture components may be detected with a flame ionization detector. The chromatograph's oven may be held at 40° C. for 1 minute and then ramped to 200° C. at 17° C./min.

Figure 27:
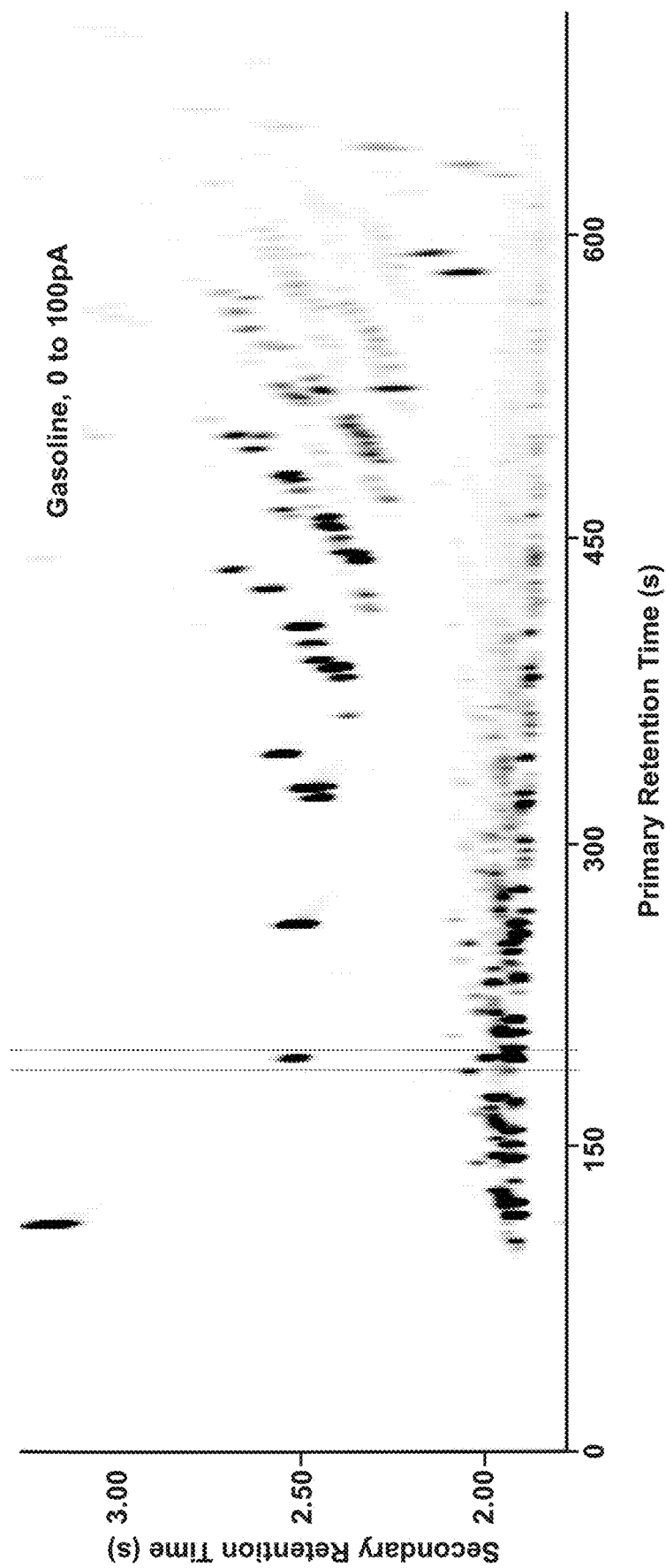
FIG. 27 is an example of GC×GC chromatogram for gasoline.

An example of GC×GC chromatogram produced for gasoline is included in FIG. 27. This chromatogram displays the GC×GC separations of petrochemical mixtures with a non-polar×polar column set: Saturated hydrocarbons may produce a horizontal band near the bottom of the chromatogram. Aromatic hydrocarbons may generate a series of "roof tile" bands that may extend in a diagonal fashion from moderate secondary retention times up to higher secondary retention times. This example column set may produce high speed separations of gasoline. For example, gasoline may be separated in about 12 minutes.

Figure 28:
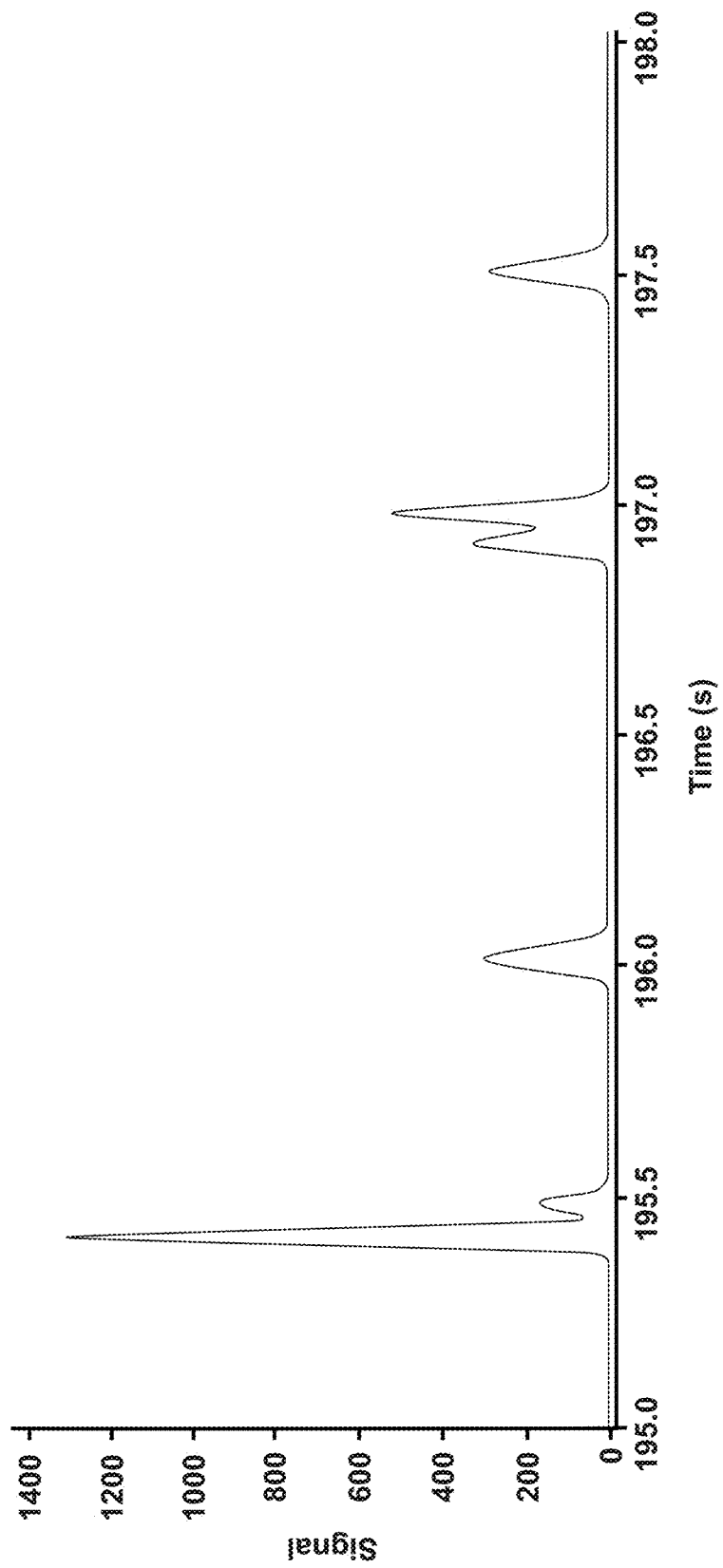
FIG. 28 is an example of a signal array as a function of time.

The performance of embodiments of a modulator may be evaluated by examining the widths of the peaks along the secondary dimension. For this purpose, a segment of the signal array used to construct the two-dimensional chromatogram may be examined. The location of this segment is generally highlighted with vertical dotted lines in FIG. 27. An example of a signal array is shown in FIG. 28. The modulated peaks may be extremely narrow with the width of a saturated hydrocarbon peak of 35 ms and the width of 45 ms for the moderately retained benzene peak, for example. Both of these widths may be close to the injection width of 30 ms. All of the peaks may have symmetric Gaussian profiles.

The secondary resolution with chromatograms, such as with a gasoline GC×GC chromatogram, produced with embodiments of a modulator may be much higher than may be obtained with full transfer flow modulators and signal intensity may not be diminished.

Embodiments of a modulator may be capable of producing extremely narrow pulses without sacrificing peak intensity. Embodiments of a modulator may be easier to optimize/tune than other differential flow modulators. Embodiments of a modulator may generate superior performance when compared to an RFF modulator, such as without increasing mechanical complexity.

Some prior embodiments disclose a modulator in a mode that may be referred to as an "over-fill/under-flush" mode. With an over-fill/under-flush mode, a modulator may be held in a load state for a sufficient period of time to overfill a loop with primary effluent and then placed into an inject state for a period of time that does not fully flush the loop of primary effluent. Such a mode may lead to undiluted pulses of primary effluent with widths just slightly less than the inject time. Over-fill/under-flush modes may produce pulses with very sharp front and rear edges.

However, with other embodiments of the disclosure, it has been found that there can be benefits to operating the modulator in essentially an opposite manner. With such an opposite mode, which may be referred to as an "under-fill/over-flush" mode, a loop volume may be increased (e.g., by just withdrawing the primary column a couple of centimeters in the loop) such that the primary effluent does not overfill the loop during the load state and the switching flow $F_s$ may be increased such that all of the collected primary effluent is flushed from the loop during the inject state.

Embodiments of an under-fill/over-flush modulation are generally illustrated in FIGS. 29 through 33. In these figures, undiluted primary effluent is identified by hatch markings. The remaining fill in the systems generally comprises carrier gas. For a context, the figures generally include some example values for flows that may be present within a modulator. The exemplary illustrative flows assume that the external flows are given by $F_1$ (e.g., 1.0 mL/min), $F_2$ (e.g., 10.0 mL/min), $F_s$ (e.g., 30.0 mL/min), and $F_x$ (e.g., 21.0 mL/min). Both external flows and internal flows are indicated in connection with FIGS. 29 through 33.

Figure 29:
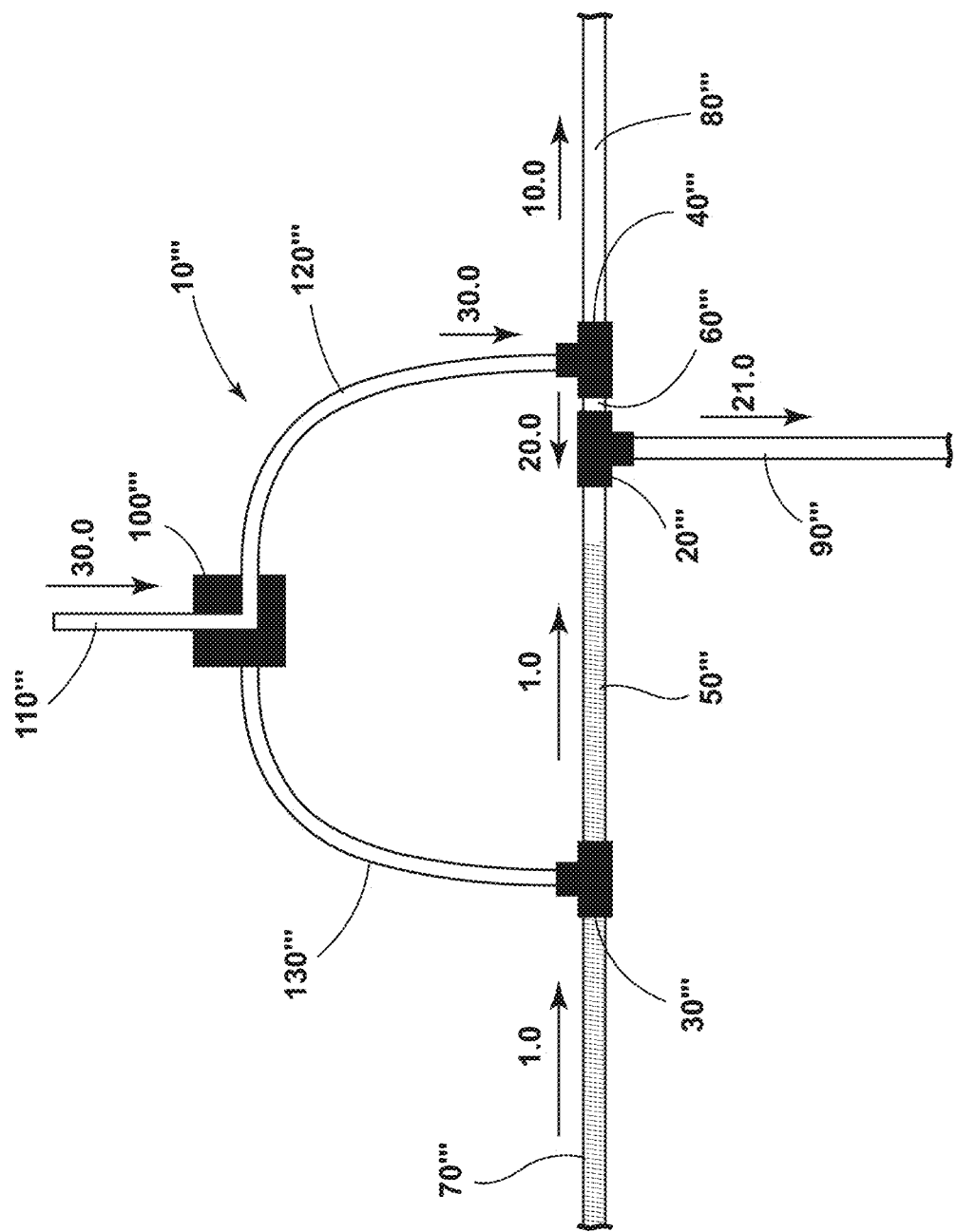
FIG. 29 is a schematic of an embodiment of an underfill/over-flush modulator according to aspects and teachings of the present disclosure, and generally illustrating a starting point in a load state.

A starting point of the modulation cycle may be considered to be a point where a modulator 10''' has been held in a load state for a sufficient length of time such that the primary effluent has nearly filled the loop 50'''. An embodiment exhibiting such a starting point is generally illustrated in FIG. 29.

Figure 30:
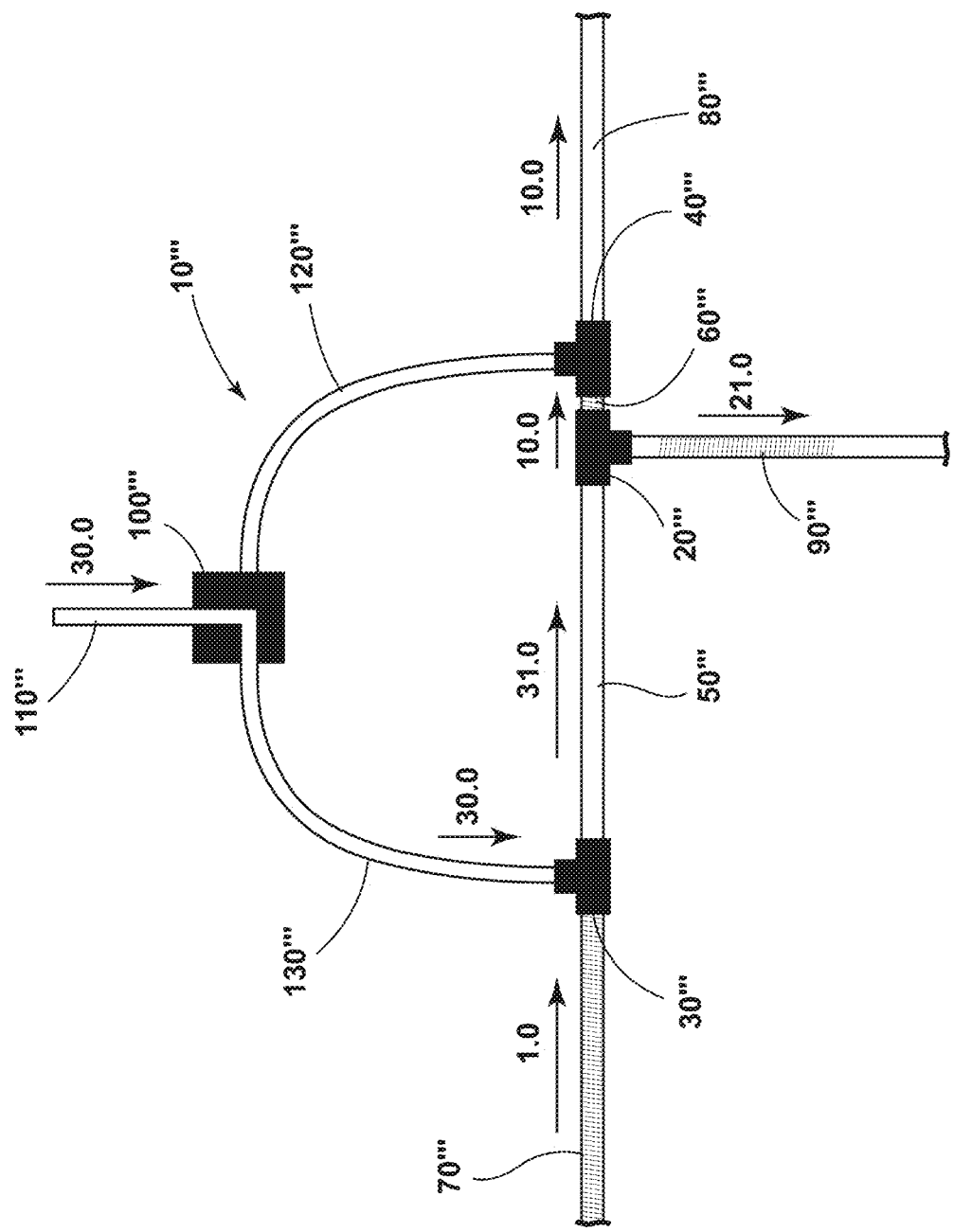
FIG. 30 is a schematic of an embodiment of an underfill/over-flush modulator according to aspects and teachings of the present disclosure, and generally illustrating a flow situation just after entering an inject state.

In such an embodiment, prior to overfilling a loop with undiluted primary effluent, a valve 100''' may be switched to an inject state. An example of a beginning of an inject state is generally illustrated in FIG. 30. The auxiliary carrier then enters at a primary tee 30''' where it combines with an incoming primary effluent to make a high flow (e.g., 31 mL/min) that rapidly pushes the plug of undiluted primary effluent through an exhaust tee 20''' where it is split between a secondary column 80''' and a flow restrictor 90''. The fraction of the collected primary effluent entering the secondary column 80''' (i.e. $F_2/F_s$) may, for example, be 10/31.

Figure 31:
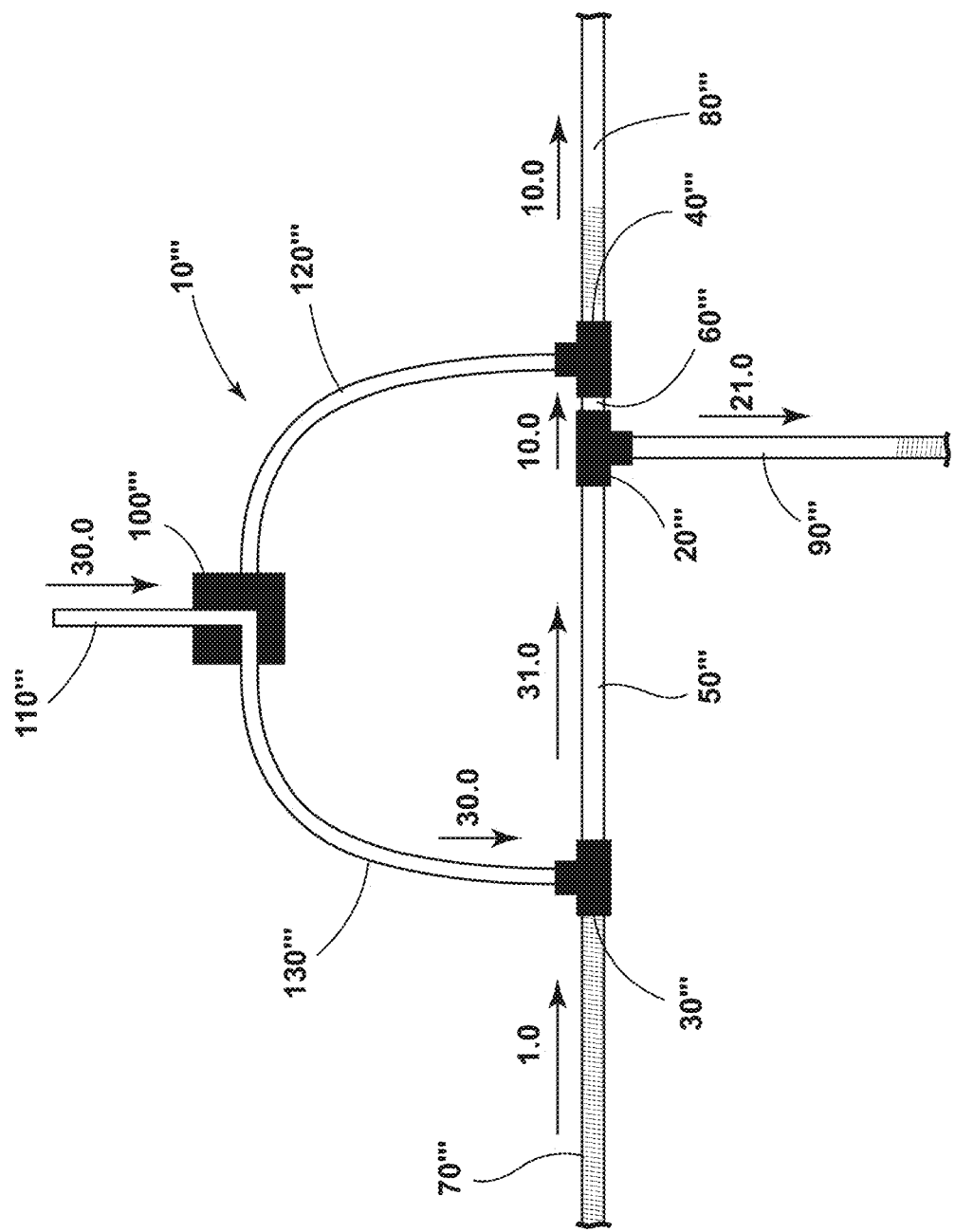
FIG. 31 is a schematic of an embodiment of an underfill/over-flush modulator according to aspects and teachings of the present disclosure, and generally illustrating a flow situation at a final moment of an inject state.
Figure 32:
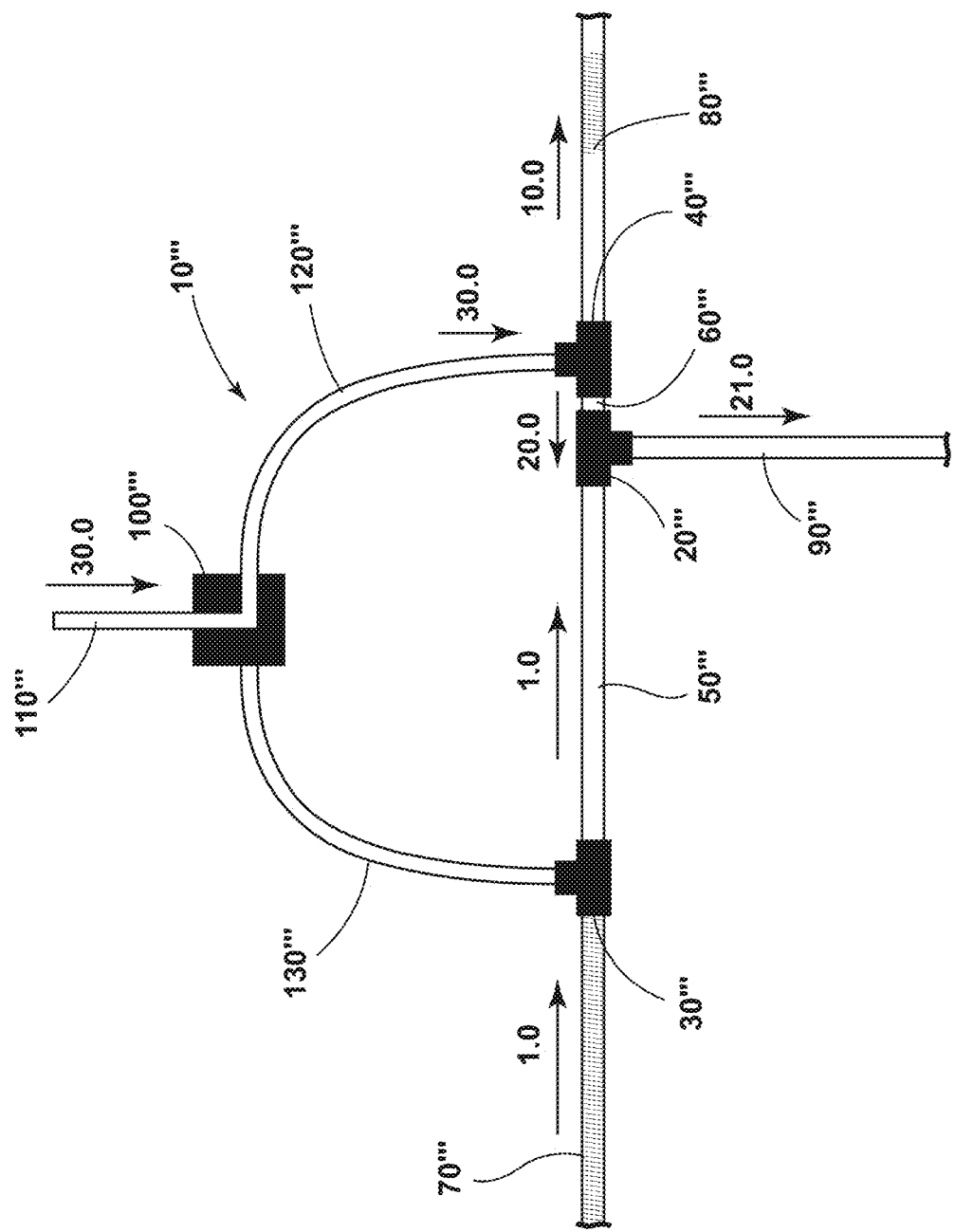
FIG. 32 is a schematic of an embodiment of an underfill/over-flush modulator according to aspects and teachings of the present disclosure, and generally illustrating a flow situation shortly after returning to a load state.
Figure 33:
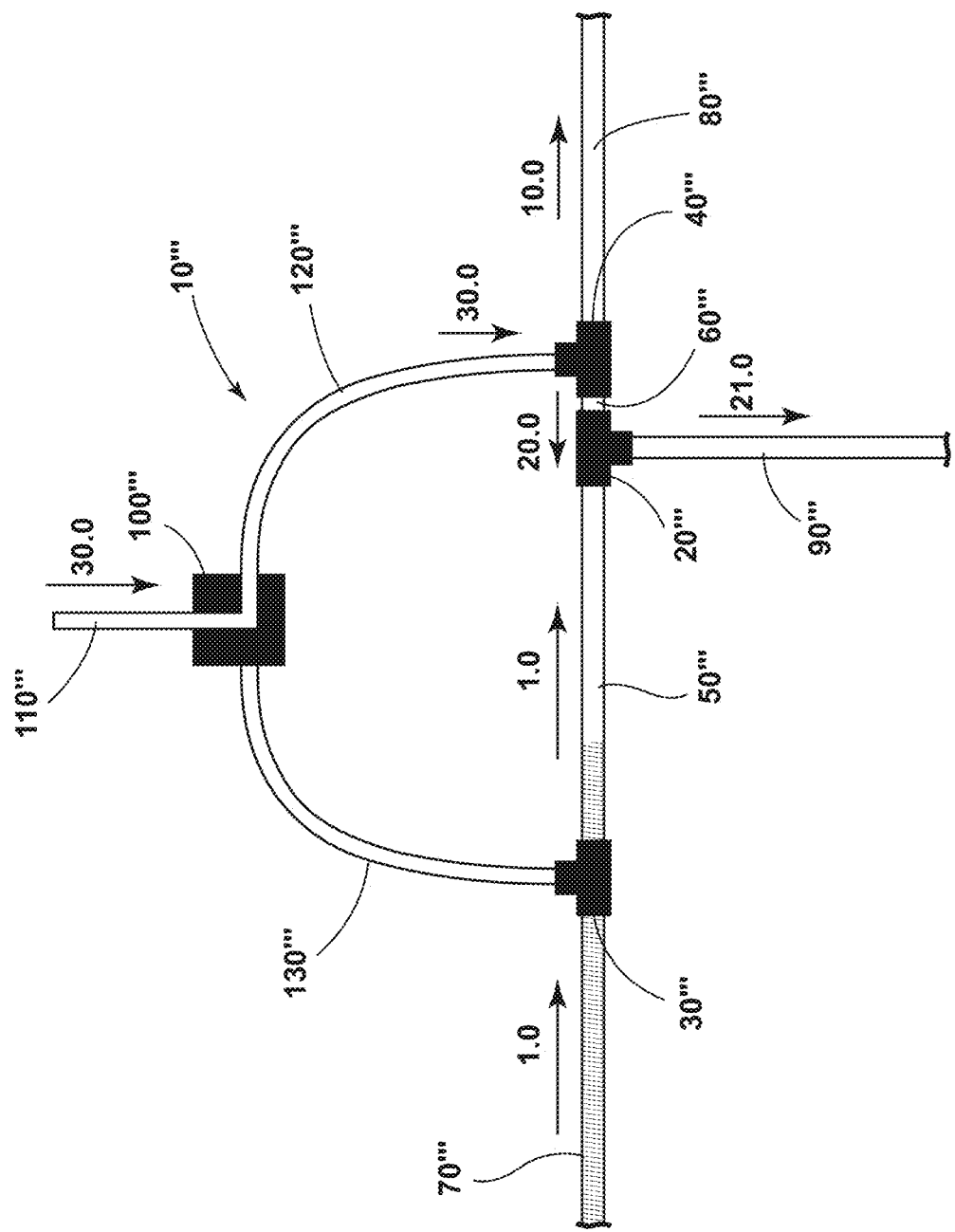
FIG. 33 is a schematic of an embodiment of an underfill/over-flush modulator according to aspects and teachings of the present disclosure, and generally illustrating a flow situation after it has been held in the load state for approximately one-half of the load time.

FIG. 31 generally illustrates an embodiment in a final moment of an inject state. In such a state, an auxiliary flow may have pushed all of the undiluted primary effluent out of the loop 50'''. FIG. 32 generally illustrates such an embodiment shortly after returning to a load state. By way of example and without limitation, an auxiliary flow (e.g., 30.0 mL/min) may enter at the secondary tee 40''' where a portion (e.g., 10.0 mL/min) continues to push an undiluted primary effluent segment down a secondary column 80''. The remaining portion of such an auxiliary flow (e.g., 20.0 mL/min) may act as a curtain flow preventing entry of additional primary effluent. At the same time, undiluted primary effluent may begin refilling the loop 50''' near the primary tee 30'''. FIG. 33 generally illustrates such an embodiment after it has been held in a load state for approximately half of the load time. The system may be held in such load state until the loop 50''' is nearly filled (see, e.g., FIG. 29) and the cycle is repeated.

In prior embodiments, it was noted that there may be a pulse shape benefit of an over-fill/under-flush mode, for example, by trimming or clipping of front and rear pulse edges. With embodiments of an under-fill/over-flush mode, such pulse edges may not be trimmed or clipped. However, a higher flow rate may be provided to flush the loop with an under-fill/over-flush mode, and that flow rate may, for example, be up to two times higher (or even more) than a flow rate used to flush the loop in over-fill/under-flush mode. Such higher flow rate associated with an under-fill/over-flush mode may, inter alia, serves to reduce or minimize a pulse broadening caused by "unclipped" front and rear edges of a pulse. It has been found with embodiments of the present disclosure that an under-fill/over-flush mode may produce pulses that are only 10% broader than their theoretical minima.

Additionally, with embodiments, a single modulator may be used in connection with either an over-fill/under-flush mode or and under-fill/over flush mode. For example, with an over-fill/under-flush mode, an auxiliary carrier flow may be operated near a minimum value utilized to quickly switch between load and inject states (e.g., 3 mL/min greater than $F_2$) and with a primary column pushed forward into a loop to decrease the effective loop length. An under-fill/over-flush mode may be established by withdrawing the primary column to the rear of the loop and working with a higher auxiliary flow (e.g., near 30 mL/min). With embodiments, an over-fill/under-flush mode may, for example, produce comparatively slightly sharper pulses, whereas an under-fill/over-flush mode may, for example, produce comparatively better quantitative precision when modulating particularly narrow primary column peaks.

Some previously discussed embodiments included a system with three tee unions and two lengths of tubing (see, for example, loop and joining tube in FIG. 15). However, the inventive concept is not limited to such a configuration, and other potentially advantageous embodiments of the concept may be constructed, including, without limitation, other configurations mentioned hereinafter.

Figure 34:
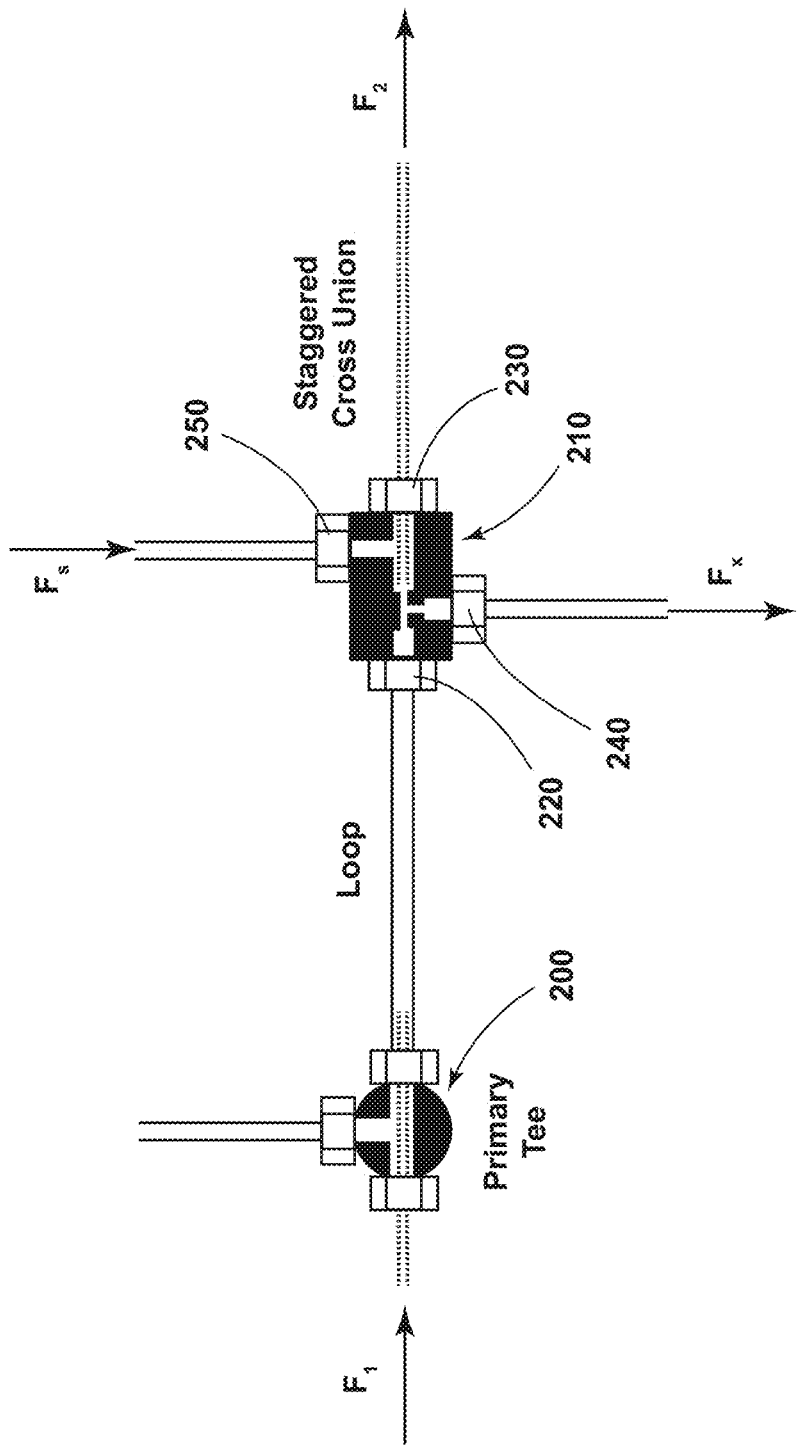
FIG. 34 is a schematic of an embodiment of a modulator according to aspects and teachings of the present disclosure, and generally illustrating a staggered cross union.

For example and without limitation, one way to reduce a possibility of leaks that could be associated with a three-tee modulator is to provide a primary tee 200 and to replace an exhaust tee, joining tube, and secondary tee with a single cross union (see, e.g., a single cross union 210 generally illustrated in FIG. 34). With such an embodiment, a cross union 210 may include a straight-through hole connecting a loop port 220 and a secondary column port 230 and may include a "stagger" in the orthogonal positions such that an exhaust port 240 and a switching flow port 250 connect to the through-hole. In such embodiments, the exhaust port 240 may connect to the through-hole closer to the loop port 220, and the switching flow port 250 may connect closer to the secondary column port 230. An entrance of the secondary column may then be positioned between the connection points of the exhaust port 240 and switching flow. An advantage of such an embodiment is that it may reduce the number of fittings from 3 to 2, it may increase the mechanical strength of the modulator (e.g., by removing a joining tube), and/or it may decrease the risk of a leak because two compression seals associated with a joining tube may be eliminated.

Figure 35:
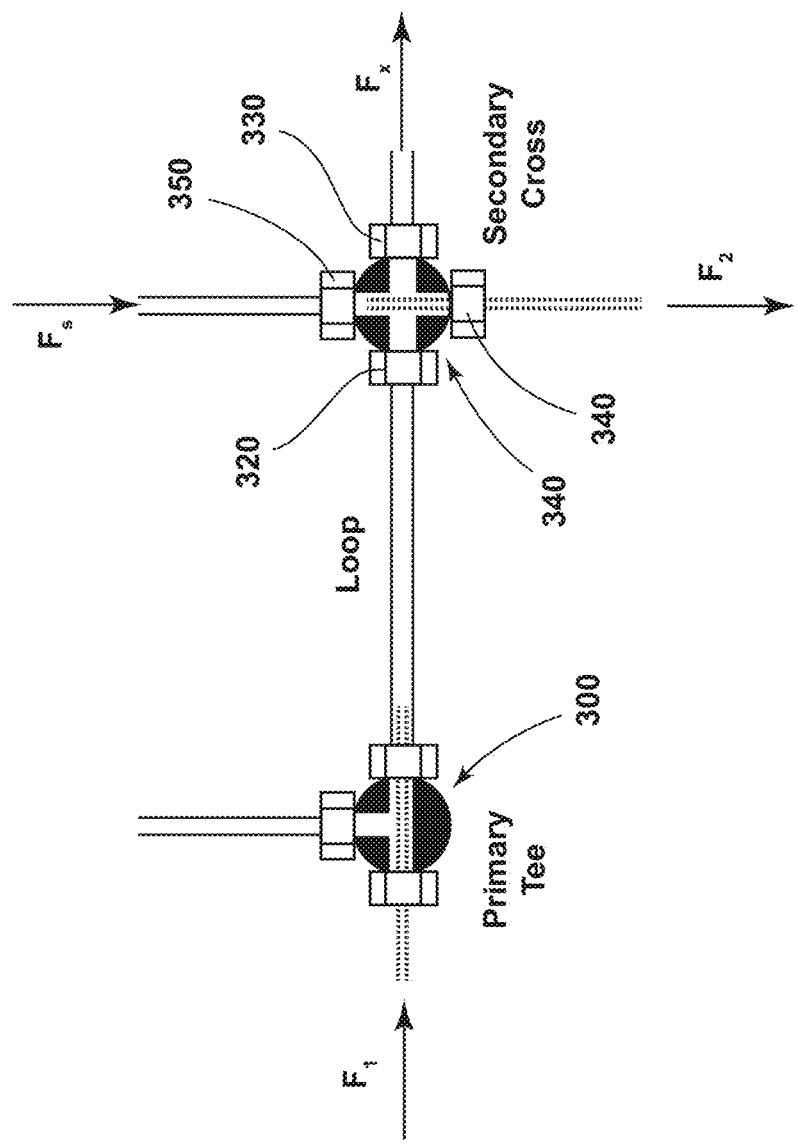
FIG. 35 is a schematic of an embodiment of a modulator according to aspects and teachings of the present disclosure, and generally illustrating the over-insertion of a second column into a standard cross union.
Figure 36:
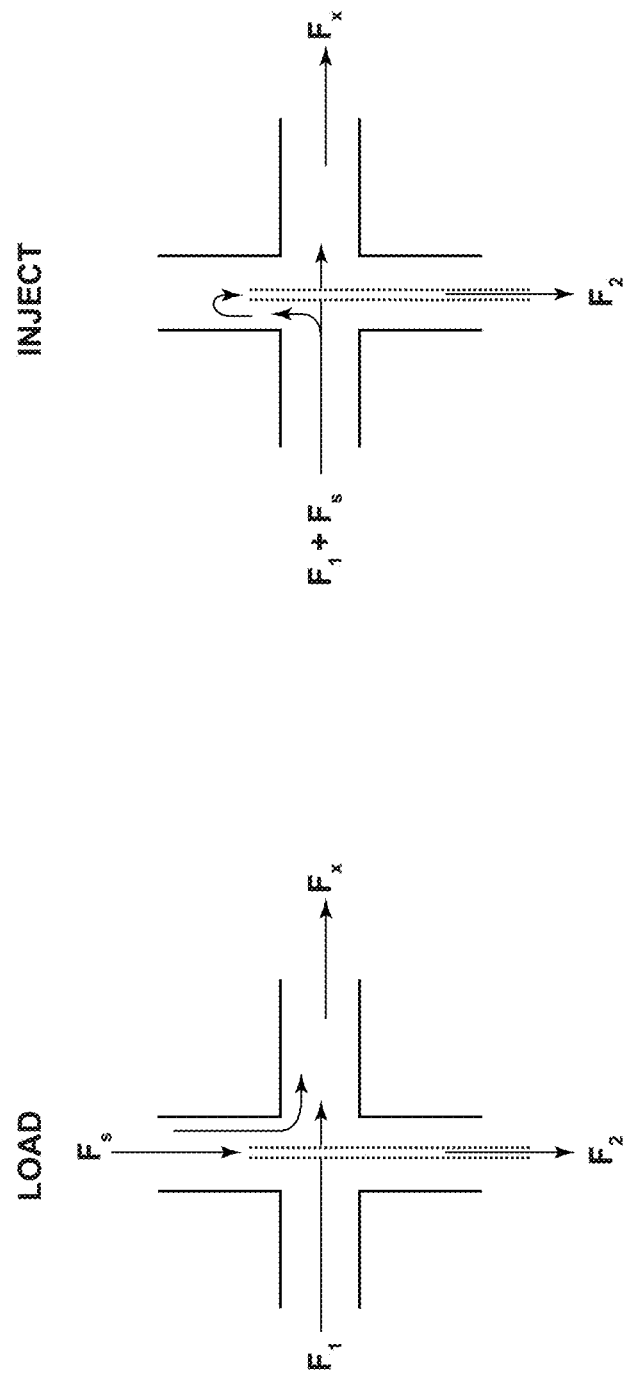
FIG. 36 is a schematic of load state and inject state flow patterns associated with a cross union.

FIG. 35 generally illustrates an embodiment of a modulator including a primary tee 300 and a cross union 310 with an over-insertion associated with a secondary column. The modulator may include a loop port 320 and a secondary column port 330 and may include an exhaust port 340 and a switching flow port 350. Such a configuration, with over-inserting a secondary column into a standard cross, may effectively mimic a staggered cross. Such a configuration may permit such a modulator/system to mimic benefits of a modulator/system having two tees and a joining capillary, but using one fitting (e.g., replacing the exhaust tee, joining capillary, and second tee with a single cross fitting). Examples of flow patterns that are produced in such a cross (with an over-insertion in a secondary column), in load and inject states, are generally depicted in FIG. 36. As generally illustrated, such an over insertion of the secondary column may cause it to be filled with auxiliary carrier during the load state and not with primary effluent. In the inject state, primary effluent can enter the secondary column. With embodiments, inserting the secondary column (e.g., approximately 1 mm) into an opposite port may provide a modulator that functions comparably to a three-tee modulator (e.g., such as the embodiment shown in FIG. 15). However, as earlier mentioned, some potential advantages of such an approach is that it may reduce the number of fittings and may increase mechanical strength. With embodiments, a risk of analyte compounds being adsorbed to an exterior of the secondary column tip may be minimized, for example, by coating an outer surface of a secondary column tip with deactivated material, including in the form of a layer of deactivated material.

Figure 37:
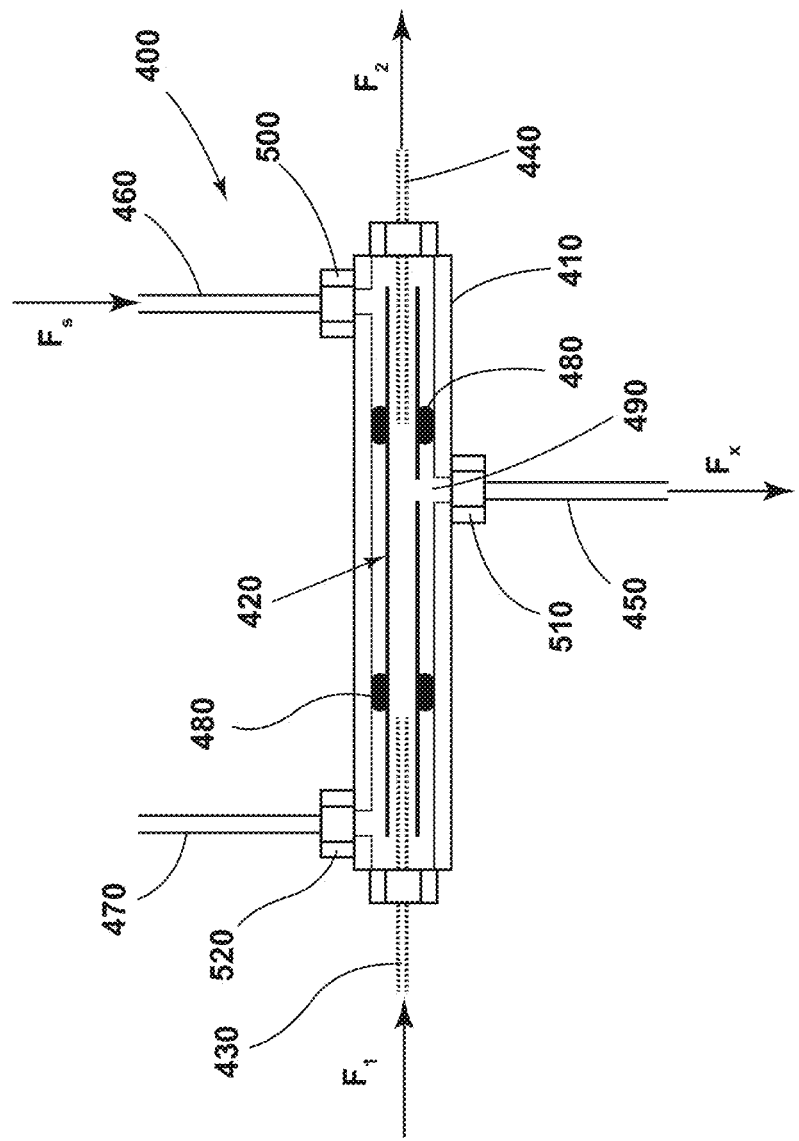
FIG. 37 is a schematic of an embodiment of a single 5-port manifold according to aspects and teachings of the present disclosure.

Another embodiment is generally illustrated in FIG. 37. Such an embodiment may replace all of the discrete tee unions with a single 5-port modulator manifold. An embodiment of a 5-port manifold 400 is generally illustrated in FIG.

37. Embodiments of a 5-port manifold may be configured, for example, to comprise a single unitary component (e.g., a single, unitary-formed body/housing structure 410) and may further include a liner 420, e.g., a ported deactivated liner (e.g., potentially comprised of silane treated glass) that may be inserted down a length of the manifold. In embodiments, such a liner may include one or more small exhaust ports drilled through the walls of the liner—for example, near a location of an outgoing exhaust tube. The device/system illustrated in FIG. 37 may include a primary column 430, a secondary column 440, a line or tube leading to an exhaust flow restrictor 450, a normally-open line from a switching valve 460, and a normally-closed line from a switching valve 470.

A liner 420 may include one or more seals 480 and may include an exhaust hole 490, which may be situated for fluid communication with an exhaust port. In embodiments, a liner 420 may be connected and/or sealed to the internal body of the manifold in at least two locations, for example, (i) between an upstream switching flow port 500 and an exhaust port 510, and (ii) between an exhaust port 510 and a downstream switching flow port 520. An entrance of the secondary column may be positioned slightly downstream of the liner exhaust port(s). With embodiments, an exhaust port may be provided by replacing a drilled liner with two pieces of tubing that may be butted together. For example, the end of one of the tubes may include small radial grooves that may act as an exhaust port when the two pieces of tubing are disposed (e.g., pressed) in an end to end configuration. Further, an "internal liner" embodiment of a modulator may provide certain advantages, for example: the modulator may have high mechanical strength; the primary effluent that eventually enters the secondary column may only contact the internal surface of the liner, so only the liner needs to be deactivated; if the modulator is fouled by low volatility sample components, the performance of the modulator can be regenerated by merely replacing the liner; and/or internal dimensions of the linear can be tailored to the specific needs of a current separation, while remaining hardware can be relatively unchanged.

Figure 38:
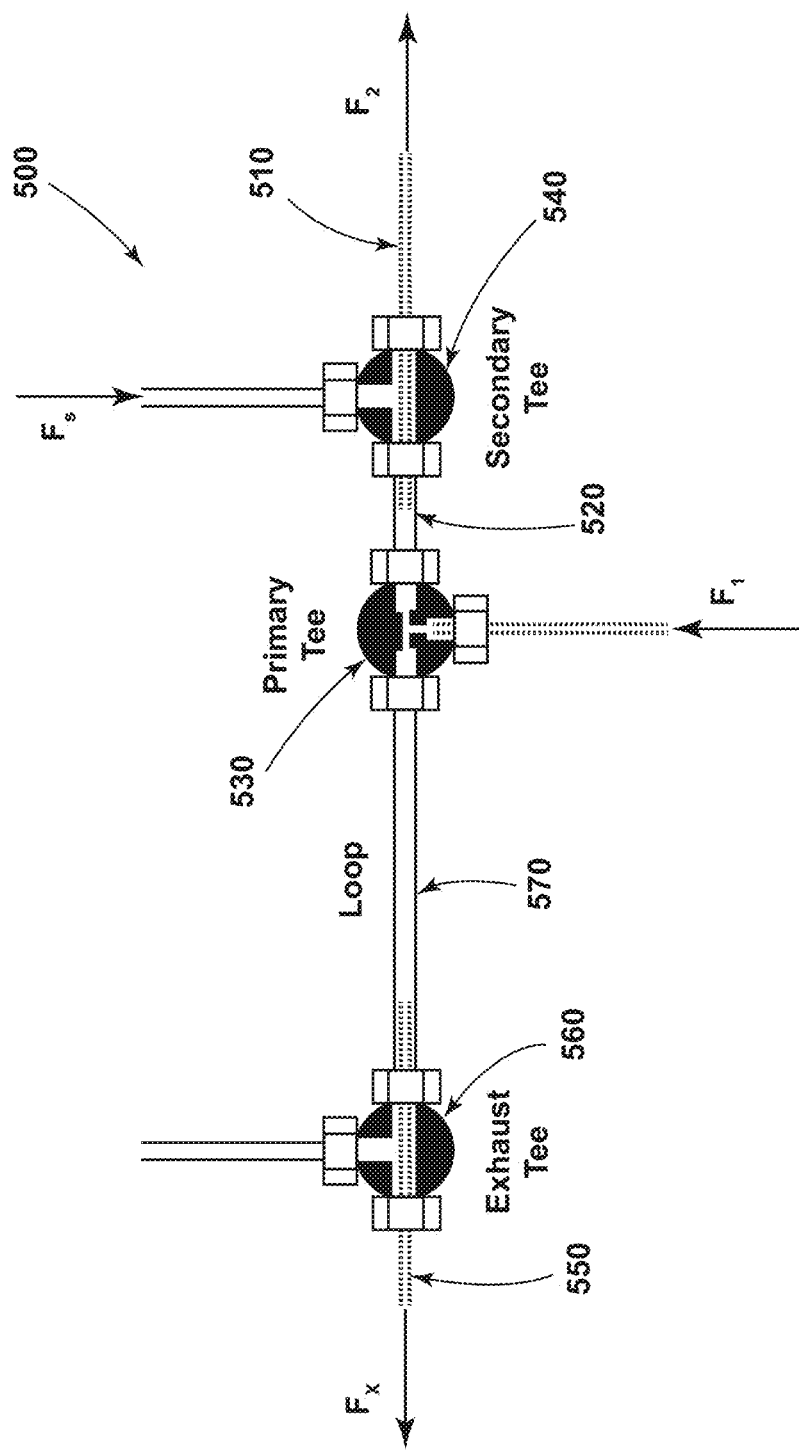
FIG. 38 is a schematic of an embodiment of a modulator that is capable of operating in a reverse fill flush mode.

With embodiments of modulators, such as generally shown in FIG. 15, it was noted that some embodiments may be operated in a reverse fill/flush mode—such as by swapping the positions of a primary column and an exhaust flow restrictor (e.g., elements 70" and 90"). An embodiment of a modulator 500 that is capable of operating in a reverse fill flush mode is generally illustrated in FIG. 38. The coaxial nature/configuration of a secondary column 510 with a joining tube 520 permits an effective length of the joining tube 520 in such embodiments to be adjusted merely by changing an insertion depth of a secondary column 510 into a joining tube 520. This adjustability may be advantageous when operating in an RFF mode in view of small curtain flows that are typically associated with an RFF mode. For example, a tip of a secondary column 510 can be withdrawn away from a primary tee 530 toward a secondary tee 540, thereby increasing an effective length of the joining tube 520 and decreasing the diffusive transport of primary effluent to an entrance of the secondary column 510. An embodiment, such as generally illustrated in FIG. 38, may also employ a conduit 550 associated with an exhaust tee 560 that leads to an exhaust flow restrictor. In embodiments, the conduit 550 may be sufficiently narrow so that it can be inserted coaxially into the loop conduit 570. An insertion depth of the flow restrictor conduit 550 can be altered to provide an adjustable effective loop length. This may be an advantageous feature, for example, when operating a modulator under over-filling conditions.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples," "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples," "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A fluid modulator, comprising:
   a fluid manifold, including:
      a primary tee;
      an exhaust tee;
      a secondary tee;
      a loop conduit;
      a joining tube; and
      a flow restrictor;
   a fluid valve, including:
      a common port;
      a normally-open output port connected to the secondary tee; and
      a normally-closed output port connected to the primary tee; and
   a pressure/flow controller configured to provide auxiliary fluid to the common port of the fluid valve;
   wherein the primary tee, the exhaust tee, and the secondary tee are configured with the primary tee and secondary tee situated at opposite ends of the fluid manifold and the exhaust tee disposed therebetween; the primary tee is connected to the exhaust tee by the loop conduit; the exhaust tee is connected to the secondary tee by the joining tube; the loop conduit is longer than the joining tube; the primary tee is configured for connection with a primary column; and the secondary tee is configured for connection with a secondary column.

2. The fluid modulator of claim 1, wherein the fluid modulator is configured not to dilute collected primary effluent and to operate in a load state and an inject state, and wherein when the fluid modulator operates in the load state, the fluid valve directs a switching flow to the secondary tee to supply carrier gas to the secondary column while a primary column effluent fills the loop conduit and the primary flow and excess switching flow is exhausted at the exhaust tee, and further wherein when the fluid modulator operates in the inject state, the fluid valve is switched and a switching flow is directed to the primary tee to flush a primary effluent from the loop conduit to the secondary column, and excess flow is directed to the exhaust tee for exit.

3. The fluid modulator of claim 2, wherein the duration of the load state can be adjusted such that the total volume of primary effluent that enters the loop is less than the total volume of the loop (under-fill) or, if desired, the total volume of primary effluent that enters the loop exceeds the volume of the loop (over-fill).

4. The fluid modulator of claim 2, wherein the duration of the inject state can be adjusted such that the volume of switching flow entering the loop is less than the total volume of the loop (under-flush) or, if desired, the total volume of switching flow that enters the loop exceeds the volume of the loop (over-flush).

5. The fluid modulator of claim 2, wherein the fluid modulator is configured to provide a modulation period comprising a load state (fill) and an inject state (flush), the load state-inject state sequence comprising either (i) over-fill/under-flush, (ii) under-fill/over-flush, (iii) over-fill/over-flush, or (iv) under-fill/under-flush.

6. The fluid modulator of claim 1, wherein the primary tee, the exhaust tee, and the secondary tee are configured in a linear or coaxial configuration.

7. The fluid modulator of claim 1, wherein the flow restrictor is connected to the exhaust tee.

8. The fluid modulator of claim 1, wherein the flow restrictor is selected from the group consisting of a static device, an adjustable device, and a combination of a static device and an adjustable device.

9. The fluid modulator of claim 1, wherein the flow restrictor comprises a back-pressure regulator.

10. The fluid modulator of claim 1, wherein the fluid manifold includes a single, unitary 5-port fluid manifold body.

11. The fluid modulator of claim 1, wherein the flow restrictor is included in the exhaust tee.

12. A fluid modulator, comprising:
   a fluid manifold, including:
      a primary tee;
      an exhaust tee;
      a secondary tee;
      a loop conduit;
      a joining tube; and
      a flow restrictor;
   a fluid valve, including:
      a common port;
      a normally-open output port connected to the secondary tee; and
      a normally-closed output port connected to the exhaust tee; and
   a pressure/flow controller configured to provide auxiliary fluid to the common port of the fluid valve;
   wherein the exhaust tee, the primary tee, and the secondary tee are configured with the exhaust tee and secondary tee situated at opposite ends of the fluid manifold and the primary tee disposed therebetween; the exhaust tee is connected to the primary tee by the loop conduit; the primary tee is connected to the secondary tee by the joining tube; the loop conduit is longer than the joining tube; the primary tee is configured for connection with a primary column; and the secondary tee is configured for connection with a secondary column.

13. The fluid modulator of claim 12, wherein the fluid modulator is configured to operate in a load state and in an inject state such that (i) when in the load state, the fluid valve directs a switching flow to the secondary tee to supply carrier gas to the secondary column, while a primary column effluent fills the loop conduit and a primary flow and excess switching flow is exhausted at the exhaust tee, and (ii) when in the inject state, the fluid valve is switched to direct the switching flow to the exhaust tee to flush a primary effluent from the loop conduit to the secondary column in the opposite direction that the loop conduit was filled, and excess switching flow is directed to the exhaust tee for exit.

14. The fluid modulator of claim 13, wherein the duration of the load state can be adjusted such that the total volume of primary effluent that enters the loop is less than the total volume of the loop (under-fill) or, if desired, the total volume of primary effluent that enters the loop exceeds the volume of the loop (over-fill).

15. The fluid modulator of claim 13, wherein the duration of the inject state can be adjusted such that the volume of switching flow entering the loop is less than the fill volume (under-flush) or, if desired, the total volume of switching flow that enters the loop exceeds the fill volume (over-flush).

16. The fluid modulator of claim 12, wherein the fluid modulator is configured to provide a modulation period comprising a load state (fill) and an inject state flush), the load state-inject state sequence comprising either (i) over-fill/under-flush, (ii) under-fill/over-flush, (iii) over-fill/over-flush, or (iv) under-fill/under-flush.

17. The fluid modulator of claim 12, wherein the exhaust tee, the primary tee, and the secondary tee are configured in a linear or coaxial configuration.

18. The fluid modulator of claim 12, wherein the flow restrictor is connected to the exhaust tee.

19. The fluid modulator of claim 12, wherein the flow restrictor is selected from the group consisting of a static device, an adjustable device, and a combination of a static device and an adjustable device.

20. The fluid modulator of claim 12, wherein the flow restrictor comprises a back-pressure regulator.

21. The fluid modulator of claim 12, wherein the exhaust tee, the primary tee, and the secondary tee are switchable to a configuration in which the primary tee and secondary tee are situated at opposite ends of the fluid manifold and the exhaust tee is disposed therebetween.

22. The fluid modulator of claim 12, wherein the fluid manifold includes a single, unitary 5-port fluid manifold body.

23. The fluid modulator of claim 12, wherein the flow restrictor is included in the exhaust tee.

* * * * *